United States Patent
Yamazaki et al.

[11] Patent Number: 6,096,406
[45] Date of Patent: Aug. 1, 2000

[54] MAGNETIC RECORDING MEDIUM

[75] Inventors: Nobuo Yamazaki; Shinji Saito, both of Kanagawa, Japan

[73] Assignee: Fuji Photo Film Co., Ltd., Kanagawa, Japan

[21] Appl. No.: 09/113,474

[22] Filed: Jul. 10, 1998

[30] Foreign Application Priority Data

Jul. 15, 1997 [JP] Japan .................................... 9-190135

[51] Int. Cl.⁷ ................................................. G11B 5/708
[52] U.S. Cl. ........................ 428/141; 428/216; 428/323; 428/329; 428/336; 428/694 BH; 428/694 BN; 428/900
[58] Field of Search ..................... 428/141, 216, 428/323, 329, 336, 694 BH, 694 BN, 900

[56] References Cited

U.S. PATENT DOCUMENTS

| | | | |
|---|---|---|---|
| 4,163,823 | 8/1979 | Legras et al. | 428/317.9 |
| 4,439,795 | 3/1984 | Kitamoto et al. | 360/131 |
| 4,447,270 | 5/1984 | Howard et al. | 106/438 |
| 4,452,830 | 6/1984 | Yoshizumi | 427/215 |
| 4,506,000 | 3/1985 | Kubota et al. | 430/39 |
| 4,507,157 | 3/1985 | Oliver, Jr. | 117/56 |
| 4,528,240 | 7/1985 | Miyoshi et al. | 428/323 |
| 4,587,157 | 5/1986 | Brock et al. | 428/216 |
| 4,617,226 | 10/1986 | Yamaguchi et al. | 428/216 |
| 4,619,856 | 10/1986 | Kamada et al. | 428/143 |
| 4,649,073 | 3/1987 | Suzuki et al. | 428/212 |
| 4,654,260 | 3/1987 | Chubachi et al. | 428/328 |
| 4,664,975 | 5/1987 | Kobayashi et al. | 428/323 |
| 4,666,769 | 5/1987 | Miyata et al. | 428/323 |
| 4,708,906 | 11/1987 | Sekiyo et al. | 428/336 |
| 4,741,953 | 5/1988 | Katsuta et al. | 428/323 |
| 4,746,558 | 5/1988 | Shimozawa et al. | 428/141 |
| 4,756,953 | 7/1988 | Utsumi | 428/220 |
| 4,784,895 | 11/1988 | Mizuno et al. | 512/25 |
| 4,794,042 | 12/1988 | Kubota et al. | 428/328 |
| 4,839,225 | 6/1989 | Matsufuji et al. | 428/336 |
| 4,844,963 | 7/1989 | Takasuna et al. | 428/65.3 |
| 4,847,147 | 7/1989 | Aonuma et al. | 428/329 |
| 4,851,289 | 7/1989 | Ogawa et al. | 428/329 |
| 4,857,388 | 8/1989 | Ogawa et al. | 428/212 |
| 4,863,791 | 9/1989 | Steward et al. | 428/310.5 |
| 4,863,793 | 9/1989 | Ogawa et al. | 428/323 |
| 4,865,924 | 9/1989 | Saito et al. . | |
| 4,874,633 | 10/1989 | Komatsu et al. | 427/54 G |
| 4,910,068 | 3/1990 | Tokagi et al. | 428/141 |
| 4,916,024 | 4/1990 | Kasuga et al. | 428/323 |
| 4,943,479 | 7/1990 | Yamada et al. | 428/331 |
| 4,952,444 | 8/1990 | Kawamata et al. | 428/141 |
| 4,963,433 | 10/1990 | Ogawa et al. | 428/323 |
| 4,965,120 | 10/1990 | Ono et al. | 428/213 |
| 5,030,484 | 7/1991 | Chino et al. | 427/434.3 |
| 5,032,428 | 7/1991 | Ogawa et al. | 427/130 |
| 5,051,291 | 9/1991 | Kowahaue et al. | 428/141 |
| 5,051,303 | 9/1991 | Naguchi et al. | 428/329 |
| 5,093,192 | 3/1992 | Kawahara et al. | 428/323 |
| 5,104,750 | 4/1992 | Kubo et al. | 428/694 MT |
| 5,112,679 | 5/1992 | Nakagawa et al. | 428/323 |

(List continued on next page.)

FOREIGN PATENT DOCUMENTS

| | | |
|---|---|---|
| 0 392 810 A2 | 10/1990 | European Pat. Off. . |
| 62-92128 | 4/1962 | Japan . |
| 63-113931 | 5/1963 | Japan . |
| 54-30002 | 3/1979 | Japan . |
| 55-55438 | 4/1980 | Japan . |
| 55-139634 | 10/1980 | Japan . |
| 57-6178 | 2/1982 | Japan . |
| 58-85931 | 5/1983 | Japan . |
| 58-139337 | 8/1983 | Japan . |
| 58-159228 | 9/1983 | Japan . |
| 58-51327 | 11/1983 | Japan . |
| 59-8124 | 1/1984 | Japan . |
| 59-154646 | 9/1984 | Japan . |
| 60-109020 | 6/1985 | Japan . |
| 60-154327 | 8/1985 | Japan . |
| 60-164926 | 8/1985 | Japan . |
| 60-193130 | 10/1985 | Japan . |
| 61-172215 | 8/1986 | Japan . |
| 61-204827 | 9/1986 | Japan . |
| 61-204829 | 9/1986 | Japan . |
| 61-214127 | 9/1986 | Japan . |
| 61-216116 | 9/1986 | Japan . |
| 61-237623 | 10/1986 | Japan . |
| 61-241325 | 10/1986 | Japan . |
| 62-001115 | 1/1987 | Japan . |
| 62-22235 | 1/1987 | Japan . |
| 62-33337 | 2/1987 | Japan . |
| 62-36727 | 2/1987 | Japan . |
| 62-159338 | 7/1987 | Japan . |
| 62-188017 | 8/1987 | Japan . |
| 62-219321 | 9/1987 | Japan . |
| 62-222427 | 9/1987 | Japan . |
| 62-234231 | 10/1987 | Japan . |
| 63-146210 | 6/1988 | Japan . |
| 63-157313 | 6/1988 | Japan . |
| 63-164022 | 7/1988 | Japan . |

(List continued on next page.)

OTHER PUBLICATIONS

The Advantages of the Thin Magnetic Layer on a Metal Particulate Tape, IEEE Transactions on Magnetics, vol. 29, No. 6, Nov. 1993.

Development of Particulate Recording Media with Ultrathin Magnetic Layer, IEICE Trans Electron, vol. E78–C. No. 11, Nov. 1995.

Enabling technologies for a 100MB 3.5" floppy (ZIP™) disk drive, 220/SPIE vol. 2604.

*Primary Examiner*—Stevan A. Resan

[57] ABSTRACT

A magnetic recording medium is described, which comprises a support having thereon in this order from the support side a substantially nonmagnetic lower layer and a magnetic layer comprising a ferromagnetic powder dispersed in a binder, wherein the magnetic layer has a coercive force of 1,800 Oe or more, central plane average surface roughness (Ra) of 5.0 nm or less, and the magnetic layer contains a diamond fine particle having an average particle size of from 0.10 to 1.0 $\mu$m in an amount of from 0.01 to 5% by weight based on the ferromagnetic powder.

12 Claims, No Drawings

U.S. PATENT DOCUMENTS

| | | | |
|---|---|---|---|
| 5,151,323 | 9/1992 | Kowahaue et al. | 428/323 |
| 5,156,908 | 10/1992 | Araki et al. | 428/323 |
| 5,160,761 | 11/1992 | Koga et al. | 427/548 |
| 5,180,616 | 1/1993 | Fukke et al. | 428/64 |
| 5,196,265 | 3/1993 | Ryoke et al. | 428/332 |
| 5,219,670 | 6/1993 | Ohno et al. | 428/694 B |
| 5,258,223 | 11/1993 | Inaba et al. | 428/323 |
| 5,266,376 | 11/1993 | Okazaki et al. | 428/141 |
| 5,268,206 | 12/1993 | Komatsu et al. | 427/548 |
| 5,300,314 | 4/1994 | Hayakawa et al. | 427/58 |
| 5,318,838 | 6/1994 | Matsufuji et al. | 428/328 |
| 5,326,618 | 7/1994 | Ryoke et al. | 428/141 |
| 5,358,777 | 10/1994 | Kojima et al. | 428/212 |
| 5,384,175 | 1/1995 | Kojima et al. | 428/65.3 |
| 5,455,104 | 10/1995 | Sekiguchi et al. | 428/212 |
| 5,455,112 | 10/1995 | Inaba et al. | 428/323 |
| 5,458,948 | 10/1995 | Yanagita et al. | 428/141 |
| 5,489,466 | 2/1996 | Inaba et al. | 428/212 |
| 5,503,911 | 4/1996 | Aoki et al. | 428/213 |
| 5,514,464 | 5/1996 | Sasaki et al. | 428/323 |
| 5,518,804 | 5/1996 | Mizuno et al. | 428/212 |
| 5,532,041 | 7/1996 | Honjo et al. | 428/141 |
| 5,547,772 | 8/1996 | Saito et al. | 428/694 B |
| 5,597,638 | 1/1997 | Saito et al. | 428/141 |
| 5,645,917 | 7/1997 | Ejiri et al. . | |
| 5,672,423 | 9/1997 | Inaba et al. | 428/323 |
| 5,756,148 | 5/1998 | Ejiri et al. . | |
| 5,763,046 | 6/1998 | Ejiri et al. . | |
| 5,780,141 | 7/1998 | Ejiri et al. . | |
| 5,792,543 | 8/1998 | Ejiri et al. . | |
| 5,795,646 | 8/1998 | Ejiri et al. . | |
| 5,811,166 | 9/1998 | Ejiri et al. . | |
| 5,811,172 | 9/1998 | Ejiri et al. . | |
| 5,827,600 | 10/1998 | Ejiri et al. . | |
| 5,851,622 | 12/1998 | Ejiri et al. . | |
| 5,955,189 | 9/1999 | Ejiri et al. | 428/323 |

FOREIGN PATENT DOCUMENTS

| | | |
|---|---|---|
| 63-317926 | 12/1988 | Japan . |
| 1-109518 | 4/1989 | Japan . |
| 1-119916 | 5/1989 | Japan . |
| 1-276422 | 7/1989 | Japan . |
| 1-220120 | 9/1989 | Japan . |
| 1-235211 | 9/1989 | Japan . |
| 1-248318 | 10/1989 | Japan . |
| 1-300419 | 12/1989 | Japan . |
| 2-15415 | 1/1990 | Japan . |
| 2-58727 | 2/1990 | Japan . |
| 2-98816 | 4/1990 | Japan . |
| 2-149916 | 6/1990 | Japan . |
| 2-194063 | 7/1990 | Japan . |
| 2-208824 | 8/1990 | Japan . |
| 2-257424 | 10/1990 | Japan . |
| 2-307806 | 12/1990 | Japan . |
| 3-17817 | 1/1991 | Japan . |
| 3-5913 | 1/1991 | Japan . |
| 3-49032 | 3/1991 | Japan . |
| 3-80422 | 4/1991 | Japan . |
| 3-88118 | 4/1991 | Japan . |
| 3-157812 | 7/1991 | Japan . |
| 3-219424 | 9/1991 | Japan . |
| 4-271010 | 9/1992 | Japan . |
| 1417442 | 12/1975 | United Kingdom . |
| 1417765 | 12/1975 | United Kingdom . |

MAGNETIC RECORDING MEDIUM

FIELD OF THE INVENTION

The present invention relates to a magnetic recording particulate medium capable of high density recording. More specifically, the present invention relates to a magnetic recording particulate medium for high density recording which comprises a magnetic layer on a substantially nonmagnetic lower layer wherein the uppermost magnetic layer contains a ferromagnetic metal fine powder or a hexagonal ferrite fine powder.

BACKGROUND OF THE INVENTION

In the field of a magnetic disc, a 2 MB MF-2HD floppy disc using Co-modified iron oxide has been generally loaded in a personal computer. However, along with the increase in the amount of data to be dealt with, the capacity thereof has become insufficient and the increase of the capacity of the floppy disc has been demanded.

In the field of a magnetic tape, with the prevalence of an office computer, such as a minicomputer, a personal computer and a work station, a magnetic tape for recording computer data as external storage medium (a so-called backup tape) has been vigorously studied. For the realization of the magnetic tape for such a use, the improvement of recording capacity has been strongly demanded conjointly with the miniaturization of a computer and the increase of information processing ability (e.g., information throughput).

Magnetic layers comprising an iron oxide, a Co-modified iron oxide, $CrO_2$, a ferromagnetic metal powder, or a hexagonal ferrite powder dispersed in a binder, which are coated on a nonmagnetic support, have been conventionally widely used in magnetic recording media. Ferromagnetic metal fine powders and hexagonal ferrite fine powders among these have been known to have excellent high density recording characteristics.

In the case of a disc, as high capacity discs using ferromagnetic metal fine powders which are excellent in high density recording characteristics, there are 10 MB MF-2TD and 21 MB MF-2SD, and as high capacity discs using hexagonal ferrite, there are 4 MB MF-2ED and 21 MB Floptical, however, any of these are not satisfactory with respect to capacities and properties. As is the circumstance, various attempts have been made to improve high density recording characteristics. Examples thereof are described below.

For improving characteristics of a disc-like magnetic recording medium, JP-A-64-84418 (the term "JP-A" as used herein means an "unexamined published Japanese patent application") proposes the use of a vinyl chloride resin having an acidic group, an epoxy group and a hydroxyl group, U.S. Pat. No. 4,788,092 proposes the use of a metal fine powder having a coercive force (Hc) of 1,000 Oe or more and a specific surface area of from 25 to 70 m²/g, and JP-B-6-28106 (the term "JP-B" as used herein means an "examined Japanese patent publication") proposes to regulate the specific surface area and magnetic susceptibility of magnetic powders and contain an abrasive.

For improving the durability of a disc-like magnetic recording medium, U.S. Pat. No. 4,690,864 proposes the use of a fatty acid ester having an unsaturated fatty acid ester and an ether bond, JP-B-7-70045 proposes the use of a fatty acid ester having a branched fatty acid ester and an ether bond, JP-A-54-124716 proposes the use of a nonmagnetic powder having a Mohs' hardness of 6 or more and a higher fatty acid ester, JP-B-7-89407 proposes to regulate the volume of voids containing a lubricant and regulate the surface roughness to from 0.005 to 0.025 μm, U.S. Pat. No. 4,828,925 proposes the use of a fatty acid ester having a low melting point and a fatty acid ester having a high melting point, U.S. Pat. No. 4,797,321 proposes the use an abrasive having a particle size of from ¼ to ¾ of the magnetic layer thickness and a fatty acid ester having a low melting point, and U.S. Pat. No. 5,635,294 proposes the use of a metallic magnetic powder containing Al and a chromium oxide.

As the constitution of a disc-like magnetic recording medium having a nonmagnetic lower layer and an intermediate layer, JP-A-3-120613 proposes the constitution comprising an electrically conductive layer and a magnetic layer containing a metal fine powder, U.S. Pat. No. 5,591,512 proposes the constitution comprising a magnetic layer having a thickness of 1 μm or less and a nonmagnetic layer, JP-A-62-159337 proposes the constitution comprising an intermediate layer comprising a carbon and a magnetic layer containing a lubricant, and JP-A-5-290358 proposes the constitution comprising a nonmagnetic layer in which the carbon size is regulated.

On the other hand, a disc-like magnetic recording medium comprising a thin magnetic layer and a functional nonmagnetic layer has been developed in recent years and floppy discs of the class with the capacity of 100 MB are now on the market. As floppy discs showing these characteristics, U.S. Pat. No. 5,384,175 proposes the constitution comprising a magnetic layer having Hc of 1,400 Oe or more and a thickness of 0.5 μm or less and a nonmagnetic layer containing electrically conductive particles, JP-A-5-197946 proposes the constitution comprising abrasives having particle sizes larger than the thickness of the magnetic layer, U.S. Pat. No. 5,549,955 proposes the constitution comprising a magnetic layer having the thickness of 0.5 μm or less with the fluctuation of the thickness being within ±15%, in which the surface electric resistance is regulated, and U.S. Pat. No. 5,389,418 proposes the constitution in which two kinds of abrasives having different particle sizes are contained and the amount of the abrasives on the surface is regulated.

Further, in the field of a tape-like magnetic recording medium, with the prevalence of an office computer, such as a minicomputer and a personal computer, a magnetic tape for recording computer data as external storage medium (a so-called backup tape) has been vigorously studied. For the realization of the magnetic tape for such a use, the improvement of recording capacity has been strongly demanded conjointly with the miniaturization of a computer and the increase of information processing capability. In addition, the use in various environmental conditions due to widening of use environments of magnetic tapes (in particular, under fluctuating temperature/humidity conditions), reliability on data storage, and reliability on performance, such as stable recording/readout of data in multiple running due to repeating use at high speed, have been increasingly demanded.

U.S. Pat. No. 5,512,350 discloses a magnetic recording medium containing at least one of an alumina, a chromium oxide and a diamond as an abrasive, and JP-A-6-52541 further discloses that running stability of a magnetic recording medium can be improved by the addition of such highly hard powders.

For the improvement of the reduction of reproduction output due to thickness loss, thinning of a magnetic layer has been known. For example, European Patent 0552611A discloses a magnetic recording medium comprising a nonmagnetic support having thereon a lower nonmagnetic layer containing an inorganic powder dispersed in a binder and an upper magnetic layer containing a ferromagnetic powder dispersed in a binder and having a thickness of 1.0 μm or less, which is coated on the lower nonmagnetic layer while the nonmagnetic layer is still wet.

However, with the rapid trend of the increase of the capacity and density of disc-like and tape-like magnetic recording media, it has become difficult to obtain satisfactory characteristics even with these techniques.

SUMMARY OF THE INVENTION

An object of the present invention is to provide a magnetic recording particulate medium capable of high density recording which is markedly improved in electromagnetic characteristics, in particular, high density recording characteristics, and has sufficiently practicable durability.

As a result of earnest studies to provide a magnetic recording particulate medium which is excellent in electromagnetic characteristics and durability, in particular, markedly improved in an error rate in a high density recording region, the present inventors have found that excellent high density recording characteristics of the object of the present invention can be obtained by the magnetic recording particulate medium having the constitution described below, thus the present invention has been attained.

The present invention can be attained by a magnetic recording medium which comprises a support having thereon in this order from the support side a substantially nonmagnetic lower layer and a magnetic layer comprising a ferromagnetic powder dispersed in a binder, wherein the magnetic layer has a coercive force of 1,800 Oe or more, central plane average surface roughness (Ra) of 5.0 nm or less, and the magnetic layer contains a diamond fine particle having an average particle size of from 0.10 to 1.0 μm in an amount of from 0.01 to 5% by weight based on the ferromagnetic powder. The present inventors have found that a magnetic recording medium having excellent high density recording characteristics, excellent durability, and markedly improved S/N ratio in high density recording region, which could not be obtained by conventional techniques, could be obtained by adopting the constitution of the present invention.

DETAILED DESCRIPTION OF THE INVENTION

The term "a substantially nonmagnetic lower layer" means a lower layer which may have a magnetic property but not too much for participating in recording and hereinafter referred to simply as "a lower layer" or "a nonmagnetic layer".

The present invention has been achieved from the examination based on the magnetic recording medium comprising a lower layer and a thin magnetic layer having high Hc and a smooth surface property provided on the lower layer, which is conventionally suitable for high density recording. The present inventors thought that the reduction of noise rather than the improvement of output was more effective and there remained large room for improvement for achieving higher density recording beyond conventional magnetic recording media.

There are various factors of noises of a magnetic recording particulate medium, such as sizes of magnetic powders and defects of magnetic layers (e.g., unevenness of a magnetic layer surface, voids, agglomeration of a magnetic powder, interfacial turbulence between a magnetic layer and a lower layer, fluctuations in magnetic layer thicknesses, and distribution of various physical properties). As a result of estimating largeness of contribution of these factors to noises, it was found out that voids, unevenness of the surface of a magnetic layer, agglomeration of a magnetic powder, and interfacial turbulence between a magnetic layer and a lower layer were largely influenced by nonmagnetic powders to be added to a magnetic layer.

From the examination based on the above-obtained knowledge, it has been found that when a diamond fine particle is used as an abrasive, a small amount should be enough to ensure durability and harmful influence to agglomeration of a magnetic powder and other defects of a magnetic layer has been markedly reduced. As a consequence, a magnetic recording particulate medium in which noise could be conspicuously improved, further, output was a little increased and both of excellent SN ratio and durability which had never been known were obtained, could be obtained.

Diamond fine particles which can be used in the present invention have an average particle size of from 0.10 to 1.0 μm, preferably from 0.10 to 0.8 μm. When an average particle size is less than 0.10 μm, the effect of improving durability is liable to lower as compared to the addition amount, while when it is larger than 1.0 μm, noise is liable to increase even though durability is improved, which is not suitable for achieving the object of the present invention.

In the present invention, the maximum size of each diamond fine particle is taken as a particle size, and the average value of measured values of 500 particles sampled randomly which are measured by an electron microscope is taken as an average particle size.

The addition amount of a diamond fine particle in the present invention is from 0.01 to 5% by weight, preferably from 0.03 to 3.00% by weight, based on the weight of the ferromagnetic powder. If the addition amount is less than 0.01% by weight, durability is obtained with difficulty and if it exceeds 5% by weight, the effect of noise reduction by means of the addition of a diamond fine particle is reduced.

The addition amount and the average particle size of a diamond fine particle are regulated within the above ranges from the viewpoint of noise and durability, but the addition amount thereof is preferably as small as possible in view of noise. It is preferred in the magnetic recording medium of the present invention to appropriately select the amount and the average particle size suitable for magnetic recording/reproduction devices from the above ranges.

Further, with respect to the particle size distribution of a diamond fine particle, it is preferred that the number of particles having the particle size of 200% or more of the average particle size accounts for 5% or less of the entire number of diamond fine particles, and the number of particles having the particle size of 50% or less of the average particle size accounts for 20% or less of the entire number of diamond fine particles. The maximum value of the particle size of the diamond fine particle for use in the present invention is about 3.00 μm, preferably about 2.00 μm, and the minimum value is about 0.01 μm, preferably about 0.02 μm.

Particle size distribution is found by counting numbers of respective sizes based on the average particle size at measurement of particle size.

Particle size distribution of a diamond fine particle also influences durability and noise of the magnetic medium. If the particle size distribution is broader than the above-described range, the effect corresponding to the average particle size set up in the present invention deviates as described above, i.e., if many particles have too large particle sizes, noise is increased and the head is scratched. While when there exist many particles having too small particle sizes, abrasive effect is insufficient. Further, a diamond fine particle having extremely narrow particle size distribution is expensive, therefore, the above-described range is economically advantageous as well.

Diamond fine particles can be used in combination with conventionally used abrasives, e.g., an alumina abrasive, in the present invention. Better effects on durability and SN ratio are obtained when a small amount of a diamond fine particle alone is used but, for economical reason, etc., an alumina abrasive can be used in combination with a diamond fine particle in an amount of preferably from 1 to 30% by weight, more preferably from 3 to 25% by weight, based on the magnetic powder. In this case, addition amount of abrasives can be considerably reduced due to the addition of a diamond fine particle as compared with the amount necessary to ensure durability with alumina alone, which is preferred in view of the security of durability and the reduction of noise.

The magnetic layer of the magnetic recording medium according to the present invention has a coercive force (Hc) of 1,800 Oe or more, preferably 2,000 Oe or more, and more preferably from 2,300 to 3,500 Oe. The upper limit is unclear but it is thought to be about 3,500 Oe from the examination using the recording head according to the present invention (Bs: 1.8T). If Hc is 1,800 Oe or less, high recording density of the object of the present invention cannot be achieved.

The magnetic layer of the present invention has a central plane average surface roughness (Ra) of 5.0 nm or less, preferably 4.0 nm or less, and more preferably 3.0 nm or less, measured by 3D-MIRAU method. If Ra exceeds 5.0 nm, the spacing loss between the magnetic recording medium and the head becomes large, as a result, output reduces and noise increases, therefore, function of the magnetic recording medium of the present invention cannot be exhibited.

Magnetic Layer

The lower layer and the ultrathin magnetic layer preferably having a thickness of 0.3 μm or less (hereinafter referred to as "upper layer" or "upper magnetic layer") of the magnetic recording medium according to the present invention may be provided on either one side of the support or may be provided on both sides. The upper layer may be coated while the lower layer coated is still wet (W/W coating) or may be coated after the lower layer coated is dried (W/D coating). Simultaneous or successive wet on wet coating is preferred in view of the productivity but in the case of a disc-like medium, wet on dry coating can be sufficiently used. In the multilayer construction according to the present invention, as the upper layer and the lower layer can be formed simultaneously or successively (with W/W coating), a surface treatment step, e.g., a calendering step, can be utilized effectively and surface roughness of the upper magnetic layer can be improved even the layer is an ultrathin layer.

Ferromagnetic Metal Fine Powder

Ferromagnetic powders which can be used in the upper magnetic layer of the present invention are preferably ferromagnetic metal powders (preferably having an average long axis length of 150 nm or less) or hexagonal ferrite powders (preferably having an average particle size of 35 nm or less).

Ferromagnetic metal powders for use in the present invention are preferably ferromagnetic alloy powders containing α-Fe as a main component. These ferromagnetic powders which can be preferably used in the magnetic layer of the present invention may contain, in addition to the prescribed atoms, the following atoms, e.g., Al, Si, S, Sc, Ca, Ti, V, Cr, Cu, Y, Mo, Rh, Pd, Ag, Sn, Sb, Te, Ba, Ta, W, Re, Au, Hg, Pb, Bi, La, Ce, Pr, Nd, P, Co, Mn, Zn, Ni, Sr and B. In particular, it is preferred to contain at least one of Al, Si, Ca, Y, Ba, La, Nd, Co, Ni and B, in addition to α-Fe, and more preferably at least one of Co, Y and Al in addition to α-Fe. The content of Co is preferably from 0 to 40 atomic %, more preferably from 15 to 35 atomic %, and most preferably from 20 to 35 atomic %, the content of Y is preferably from 1.5 to 12 atomic %, more preferably from 3 to 10 atomic %, and most preferably from 4 to 9 atomic %, the content of Al is preferably from 1.5 to 12 atomic %, more preferably from 3 to 10 atomic %, and most preferably from 4 to 9 atomic %, each based on Fe. These ferromagnetic powders may be previously treated with the later described dispersant, lubricant, surfactant, and antistatic agent before dispersion. Specific examples thereof are disclosed in JP-B-44-14090, JP-B-45-18372, JP-B-47-22062, JP-B-47-22513, JP-B-46-28466, JP-B-46-38755, JP-B-47-4286, JP-B-47-12422, JP-B-47-17284, JP-B-47-18509, JP-B-47-18573, JP-B-39-10307, JP-B-46-39639, U.S. Pat. Nos. 3,026,215, 3,031,341, 3,100,194, 3,242,005, and 3,389,014.

Ferromagnetic alloy fine powders may contain a small amount of a hydroxide or an oxide. Ferromagnetic alloy fine powders can be prepared by well-known processes, such as a method comprising reducing a composite organic acid salt (mainly an oxalate) with a reducing gas, e.g., hydrogen; a method comprising reducing iron oxide with a reducing gas, e.g., hydrogen, to obtain Fe or Fe—Co particles; a method comprising pyrolysis of a metal carbonyl compound; a method comprising adding to an aqueous solution of a ferromagnetic metal a reducing agent, e.g., sodium boronhydride, hypo-phosphite, or hydrazine, to conduct reduction; and a method comprising evaporating a metal in a low pressure inert gas to obtain a fine powder. The thus-obtained ferromagnetic alloy powders which are subjected to well-known gradual oxidization treatment can be used in the present invention, e.g., a method comprising immersing powders in an organic solvent, then drying; a method comprising immersing powders in an organic solvent, then charging an oxygen-containing gas to form oxide films on the surfaces thereof and drying; and a method comprising forming oxide films on the surfaces of the powders by regulating partial pressure of an oxygen gas and an inert gas without using an organic solvent.

Ferromagnetic metal powders which can be preferably used in the magnetic layer according to the present invention have a specific surface area ($S_{BET}$) as measured by the BET method of from 45 to 80 m$^2$/g, preferably from 50 to 70 m$^2$/g. When $S_{BET}$ is 45 m$^2$/g or less, noise increases and when 80 m$^2$/g or more, good surface property is obtained with difficulty, which is not preferred. Ferromagnetic metal powders which can be preferably used in the magnetic layer according to the present invention have a crystallite size of generally from 80 to 180 Å, preferably from 100 to 180 Å, and more preferably from 110 to 175 Å. The length of a long axis of ferromagnetic metal powders is generally from 0.01 to 0.25 μm, preferably from 0.03 to 0.15 μm, and more preferably from 0.03 to 0.12 μm. Ferromagnetic metal powders preferably have an acicular ratio of from 3 to 15, more preferably from 5 to 12. Ferromagnetic metal powders have a saturation magnetization ($\sigma_s$) of generally from 100 to 200 emu/g, and preferably from 120 to 180 emu/g.

Ferromagnetic metal powders preferably have a water content of from 0.01 to 2% by weight. The water content of ferromagnetic metal powders is preferably optimized by selecting the kinds of binders. The pH of ferromagnetic metal powders is preferably optimized by the combination with the binder to be used. The pH range is from 4 to 12, preferably from 6 to 10. Ferromagnetic metal powders may be surface-treated with Al, Si, P or oxides thereof, if necessary. The amount thereof is from 0.1 to 10% by weight based on the ferromagnetic metal powders. Adsorption of a lubricant, e.g., fatty acid, becomes 100 mg/m$^2$ or less by conducting a surface treatment, which is, therefore, preferred. Soluble inorganic ions (e.g., Na, Ca, Fe, Ni, Sr, etc.) are sometimes contained in ferromagnetic metal powders. It is preferred substantially not to contain such soluble inorganic ions but the properties of ferromagnetic metal powders are not particularly affected if the content is 200 ppm or less. Ferromagnetic metal powders for use in the present invention preferably have less voids and the value thereof is 20% by volume or less, more preferably 5% by volume or less. The shape of ferromagnetic metal powders is not particularly limited, and any shape such as an acicular shape, an ellipsoidal shape or a spindle shape may be used so long as it satisfies the above-described properties as to particle sizes. Switching Field Distribution (SFD) of the ferromagnetic metal powder itself is preferably small, preferably 0.8 or less. It is necessary to make Hc distribution of ferromagnetic metal powders narrow. When the SFD is 0.8 or less, electromagnetic characteristics are excellent, high output can be obtained, reversal of magnetization becomes sharp and peak shift is less, therefore, suitable for high density digital magnetic recording. For achieving small Hc distribution, making particle size distribution of goethite in ferromagnetic metal powders good and preventing sintering are effective methods for ferromagnetic metal powders.

Hexagonal Ferrite Fine Powder

Examples of hexagonal ferrite which can be preferably used in the upper magnetic layer in the present invention include substitution products of barium ferrite, strontium ferrite, lead ferrite and calcium ferrite and Co substitution products. Specifically, magnetoplumbite type barium ferrite and strontium ferrite, magnetoplumbite type ferrite having covered the particle surfaces with spinel, magnetoplumbite type barium ferrite and strontium ferrite partially containing spinel phase, etc. Hexagonal ferrite powders may contain, in addition to the prescribed atoms, the following atoms, e.g., Al, Si, S, Sc, Ti, V, Cr, Cu, Y, Mo, Rh, Pd, Ag, Sn, Sb, Te, Ba, Ta, W, Re, Au, Hg, Pb, Bi, La, Ce, Pr, Nd, P, Co, Mn, Zn, Ni, Sr, B, Ge and Nb. In general, those containing the following elements can be used, e.g., Co—Zn, Co—Ti, Co—Ti—Zr, Co—Ti—Zn, Ni—Ti—Zn, Nb—Zn—Co, Sb—Zn—Co, Nb—Zn, etc. According to starting materials and producing processes, specific impurities may be contained. The hexagonal ferrite fine powder has a hexagonal tabular diameter of from 10 to 50 nm, preferably from 10 to 40 nm, and particularly preferably from 10 to 35 nm.

When reproduction is conducted using a magneto resistance head (an MR head) for increasing track density, it is necessary to reduce noise, accordingly the tabular diameter is preferably 35 nm or less, but if it is smaller than 10 nm, stable magnetization cannot be obtained due to thermal fluctuation. While when it is more than 50 nm, noise increases, therefore, both of such particle diameters are not suitable for high density recording. A tabular ratio (tabular diameter/tabular thickness) is preferably from 1 to 15, more preferably from 1 to 7. If a tabular ratio is small, the packing density in a magnetic layer becomes high, which is preferred but satisfactory orientation cannot be obtained. If a tabular ratio is more than 15, noise increases due to stacking among particles. The specific surface area ($S_{BET}$) measured by the BET method of the particles having diameters within this range is from 30 to 200 m$^2$/g. Specific surface areas nearly coincide with the values obtained by arithmetic operations from tabular diameters and tabular thicknesses. Distribution of tabular diameter/tabular thickness is generally preferably as narrow as possible. It is difficult to show specific surface area distributions in numerical values but distributions can be compared by measuring TEM photographs of 500 particles selected randomly. Distributions are in many cases not regular distribution, but when expressed by the standard deviation to the average diameter from calculation, σ/average diameter is from 0.1 to 2.0. For obtaining narrow particle size distribution, it is efficient to make a particle forming reaction system homogeneous as far as possible, and particles formed are subjected to distribution-improving treatments as well. For example, a method of selectively dissolving ultrafine particles in an acid solution is also known. Coercive force (Hc) of generally from about 500 to about 5,000 Oe measured in magnetic powders can be produced. Higher Hc is advantageous for high density recording but it is restricted by capacities of recording heads. Hc can be controlled by particle diameters (tabular diameter/tabular thickness), kinds and amounts of elements contained, substitution sites of elements, and reaction conditions of particle formation. Saturation magnetization ($\sigma_s$) is from 30 to 80 emu/g. $\sigma_s$ has inclination of becoming smaller as particles become finer. For the improvement thereof, a method of reducing the crystallization temperature or heat treatment temperature and time, a method of increasing the amount of the compound to be added, or a method of increasing the surface treating amount may be used in the production of hexagonal ferrite powder. W-type hexagonal ferrite can also be used. Further, when magnetic powders are dispersed, particle surfaces of magnetic powders may be treated with substances compatible with the dispersion media and the polymers. Inorganic or organic compounds are used as a surface treating agent. For example, oxide or hydroxide of Si, Al, P, etc., various kinds of silane coupling agents, and various kinds of titanium coupling agents are representative examples. The amount of these surface treating agents is from 0.1 to 10% by weight based on the amount of the magnetic powder. The pH of magnetic powders is also important for dispersion, and is in general from 4 to 12. The optimal value is dependent upon the dispersion medium and the polymer. Taking chemical stability and storage stability of magnetic media into consideration, pH of from 6 to 11 or so is selected. The water content in the magnetic powder also affects dispersion. The optimal value is dependent upon the dispersion medium and the polymer, and the water content of from 0.01 to 2.0% by weight is selected in general. Producing methods of hexagonal ferrite powders include the following and any of these methods can be used in the present invention: (1) a glass crystallization method in which metal oxides which substitute barium oxide, iron oxide and iron, and boron oxide, etc., as a glass forming material are mixed so as to make a desired ferrite composition, melted, and then quenched to obtain an amorphous product, the obtained product is reheat-treated, washed and then pulverized to obtain a barium ferrite crystal powder, (2) a hydrothermal reaction method in which a solution of barium ferrite composition metal salts is neutralized with an alkali, byproducts are removed followed by liquid phase heating at 100° C. or more, washed, dried and then pulverized to obtain a barium ferrite crystal powder, and (3) a coprecipitation method in which a solution of barium ferrite composition metal salts is neutralized with an alkali, byproducts are removed followed by drying, treated at 1,100° C. or less, and then pulverized to obtain a barium ferrite crystal powder.

Lower Layer

The lower layer is described in detail below. The constitution of the lower layer in the present invention is not particularly limited as far as it is substantially nonmagnetic but, in general, the lower layer comprises at least a resin, preferably those comprising a powder, e.g., an inorganic or organic powder dispersed in a resin. The inorganic powder is, in general, preferably a nonmagnetic powder but a magnetic powder can also be used as far as the lower layer is substantially nonmagnetic. "The lower layer is substantially nonmagnetic" means that the lower layer may be magnetic within the range of not substantially reducing the electromagnetic characteristics of the upper layer.

Nonmagnetic powders can be selected from the following inorganic compounds such as metal oxide, metal carbonate, metal sulfate, metal nitride, metal carbide, metal sulfide, etc. Examples of inorganic compounds are selected from the following compounds and they can be used alone or in combination, e.g., $\alpha$-alumina having an alpha-conversion rate of 90% or more, $\beta$-alumina, $\gamma$-alumina, $\theta$-alumina, silicon carbide, chromium oxide, cerium oxide, $\alpha$-iron oxide, hematite, goethite, corundum, silicon nitride, titanium carbide, titanium oxide, silicon dioxide, stannic oxide, magnesium oxide, tungsten oxide, zirconium oxide, boron nitride, zinc oxide, calcium carbonate, calcium sulfate, barium sulfate, and molybdenum disulfide. Of these compounds, particularly preferred are titanium dioxide, zinc oxide, iron oxide and barium sulfate because they have small particle size distribution and various means for imparting functions, and more preferred are titanium dioxide and $\alpha$-iron oxide. These nonmagnetic powders preferably have a particle size of from 0.005 to 2 $\mu$m. If desired, a plurality of nonmagnetic powders each having a different particle size may be combined, or a single nonmagnetic powder having a broad particle size distribution may be employed so as to attain the same effect as such a combination. A particularly preferred particle size of nonmagnetic powders is from 0.01 to 0.2 $\mu$m. In particular, when the nonmagnetic powder is a granular metal oxide, the average particle size thereof is preferably 0.08 $\mu$m or less, and when it is an acicular metal oxide, the long axis length thereof is preferably 0.3 $\mu$m or less, more preferably 0.2 $\mu$m or less. Nonmagnetic powders for use in the present invention have a tap density of from 0.05 to 2 g/ml, preferably from 0.2 to 1.5 g/ml; a water content of from 0.1 to 5% by weight, preferably from 0.2 to 3% by weight, and more preferably from 0.3 to 1.5% by weight; a pH value of from 2 to 11, preferably from 3 to 10, particularly preferably from 7 to 10; a specific surface area ($S_{BET}$) of from 1 to 100 m$^2$/g, preferably from 5 to 80 m$^2$/g, and more preferably from 10 to 70 m$^2$/g; a crystallite size of from 0.004 to 1 $\mu$m, and more preferably from 0.04 to 0.1 $\mu$m; an oil absorption amount using DBP (dibutyl phthalate) of from 5 to 100 ml/100 g, preferably from 10 to 80 ml/100 g, and more preferably from 20 to 60 ml/100 g; and a specific gravity of from 1 to 12, and preferably from 3 to 6. The shape of nonmagnetic powders may be any of an acicular, spherical, polyhedral, or tabular shape. Nonmagnetic powders preferably have a Mohs' hardness of from 4 to 10. The SA (stearic acid) absorption amount of nonmagnetic powders is from 1 to 20 $\mu$mol/m$^2$, preferably from 2 to 15 $\mu$mol/m$^2$, and more preferably from 3 to 8 $\mu$mol/m$^2$. The surfaces of these nonmagnetic powders are preferably covered with $Al_2O_3$, $SiO_2$, $TiO_2$, $ZrO_2$, $SnO_2$, $Sb_2O_3$, ZnO or $Y_2O_3$. Preferred in the point of dispersibility are $Al_2O_3$, $SiO_2$, $TiO_2$ and $ZrO_2$, and more preferred are $Al_2O_3$, $SiO_2$ and $ZrO_2$. They can be used in combination or alone. A method in which the surface treatment may be performed by coprecipitation, alternatively, surface treatment of particles may be previously performed to be covered with alumina in the first place, then the alumina-covered surface is covered with silica, or vice versa, according to purposes. The surface-covering layer may be porous layer, if necessary, but a homogeneous and dense surface is generally preferred.

Specific examples of nonmagnetic powders for use in the lower layer according to the present invention include Nanotite (manufactured by Showa Denko Co., Ltd.), HIT-100 and ZA-G1 (manufactured by Sumitomo Chemical Co., Ltd.), ($\alpha$-hematite DPN-250, DPN-250BX, DPN-245, DPN-270BX, DPN-500BX, DBN-SA1, and DBN-SA3 (manufactured by Toda Kogyo Co., Ltd.), titanium oxide TTO-51B, TTO-55A, TTO-55B, TTO-55C, TTO-55S, TTO-55D, SN-100, $\alpha$-hematite E270, E271, E300, and E303 (manufactured by Ishihara Sangyo Kaisha Ltd.), titanium oxide STT-4D, STT-30D, STT-30, STT-65C, and $\alpha$-hematite $\alpha$-40 (manufactured by Titan Kogyo Co., Ltd.), MT-100S, MT-100T, MT-150W, MT-500B, MT-600B, MT-100F, and MT-500HD (manufactured by Teika Co., Ltd.), FINEX-25, BF-1, BF-10, BF-20, and ST-M (manufactured by Sakai Chemical Industry Co., Ltd.), DEFIC-Y and DEFIC-R (manufactured by Dowa Mining Co., Ltd.), AS2BM and $TiO_2$ P25 (manufactured by Nippon Aerosil Co., Ltd.), and 100A, 500A and calcined products thereof (manufactured by Ube Industries, Ltd.). Particularly preferred nonmagnetic powders are titanium dioxide and $\alpha$-iron oxide.

By the incorporation of carbon blacks into the lower layer, a desired micro Vickers' hardness can be obtained in addition to the well-known effects of reducing surface electrical resistance (Rs) and light transmittance. Further, it is also possible to obtain the effect of stocking a-lubricant by the incorporation of carbon blacks into the lower layer. Furnace blacks for rubbers, thermal blacks for rubbers, carbon blacks for coloring, acetylene blacks, etc. can be used therefor. Carbon blacks used in the lower layer should optimize the following characteristics by the desired effects and sometimes more effects can be obtained by the combined use.

Carbon blacks for use in the lower layer according to the present invention have a specific surface area ($S_{BET}$) of from 100 to 500 m$^2$/g, preferably from 150 to 400 m$^2$/g, a DBP oil absorption of from 20 to 400 ml/100 g, preferably from 30 to 400 ml/100 g, an average particle size of from 5 to 80 m$\mu$, preferably from 10 to 50 m$\mu$, and more preferably from 10 to 40 m$\mu$, pH of from 2 to 10, a water content of from 0.1 to 10% by weight, and a tap density of from 0.1 to 1 g/ml. Specific examples of carbon blacks for use in the lower layer according to the present invention include BLACK-PEARLES 2000, 1300, 1000, 900, 800, 880 and 700, and VULCAN XC-72 (manufactured by Cabot Co., Ltd.), #3050B, #3150B, #3250B, #3750B, #3950B, #950, #650B, #970B, #850B, MA-600, MA-230, #4000 and #4010 (manufactured by Mitsubishi Kasei Corp.), CONDUCTEX SC, RAVEN 8800, 8000, 7000, 5750, 5250, 3500, 2100, 2000, 1800, 1500, 1255 and 1250 (manufactured by Columbia Carbon Co., Ltd.), and Ketjen Black EC (manufactured by Akzo Co., Ltd.). Carbon blacks for use in the present invention may previously be surface-treated with a dispersant, may be grafted with a resin, or a part of the surface thereof may be graphitized before use. The carbon black may be previously dispersed in a binder before addition to the coating solution. Carbon blacks can be used within the range not exceeding 50% by weight based on the above inorganic powders and not exceeding 40% by weight based on the total weight of the nonmagnetic layer. These carbon blacks can be used alone or in combination. Regarding carbon blacks for use in the present invention, for example, the disclosure in *Handbook of Carbon Blacks* (edited by Carbon Black Association of Japan) can be referred to.

Organic powders can be used in the lower layer according to the purpose. Examples of such the organic powders include an acryl styrene resin powder, a benzoguanamine resin powder, a melamine resin powder, and a phthalocyanine pigment. In addition, at least one of a polyolefin resin powder, a polyester resin powder, a polyamide resin powder, a polyimide resin powder, and a polyethylene fluoride resin powder can also be used. The producing methods thereof are disclosed in JP-A-62-18564 and JP-A-60-255827.

Binder resins, lubricants, dispersants, additives, solvents, dispersing methods, etc., used for the magnetic layer described below can be used in the lower layer. In particular, with respect to the amounts and the kinds of binder resins, additives, the amounts and the kinds of dispersants, well-known prior art techniques regarding the magnetic layer can be applied in the lower layer.

Binder

Conventionally well-known thermoplastic resins, thermosetting resins, reactive resins and mixtures of these resins are used as a binder in the present invention. Thermoplastic resins having a glass transition temperature of from −100 to 150° C., a number average molecular weight of from 1,000 to 200,000, preferably from 10,000 to 100,000, and a polymerization degree of about 50 to 1,000 can be used in the present invention.

Examples thereof include polymers or copolymers containing as a constituting unit the following compounds, such as vinyl chloride, vinyl acetate, vinyl alcohol, maleic acid, acrylic acid, acrylate, vinylidene chloride, acrylo-nitrile, methacrylic acid, methacrylate, styrene, butadiene, ethylene, vinyl butyral, vinyl acetal and vinyl ether; polyurethane resins and various rubber resins. Examples of thermosetting resins and reactive resins usable in the present invention include phenol resins, epoxy resins, curable type polyurethane resins, urea resins, melamine resins, alkyd resins, acrylic reactive resins, formaldehyde resins, silicone resins, epoxy-polyamide resins, mixtures of polyester resins and isocyanate prepolymers, mixtures of polyesterpolyol and polyisocyanate, and mixtures of polyurethane and polyisocyanate. Details on these resins are described in *Plastic Handbook*, published by Asakura Shoten. It is also possible to use well-known electron beam curable type resins in each layer. Examples of these resins and producing methods are disclosed in detail in JP-A-62-256219. These resins can be used alone or in combination. Examples of preferred combinations include at least one selected from vinyl chloride resins, vinyl chloride-vinyl acetate copolymers, vinyl chloride-vinyl acetate-vinyl alcohol copolymers, and vinyl chloride-vinyl acetate-maleic anhydride copolymers with polyurethane resins, or combinations of these resins with polyisocyanate.

As polyurethane resins, those having well-known structures can be used, e.g., polyester polyurethane, polyether polyurethane, polyether polyester polyurethane, polycarbonate polyurethane, polyester polycarbonate polyurethane, polycaprolactone polyurethane, etc. Preferably, at least one polar group selected from the following groups is introduced into the above binders by copolymerization or addition reaction for the purpose of further improving the dispersibility and the durability, e.g., —COOM, —SO$_3$M, —OSO$_3$M, —P=O(OM)$_2$, —O—P=O(OM)$_2$ (wherein M represents a hydrogen atom, or an alkali metal salt group), —OH, —NR$^2$, —N$^+$R$_3$ (R represents a hydrocarbon group), an epoxy group, —SH, or —CN. The content of the polar group is from $10^{-1}$ to $10^{-8}$ mol/g, preferably from $10^{-2}$ to $10^{-6}$ mol/g.

Specific examples of binders for use in the present invention include VAGH, VYHH, VMCH, VAGF, VAGD, VROH, VYES, VYNC, VMCC, XYHL, XYSG, PKHH, PKHJ, PKHC, and PKFE (manufactured by Union Carbide Co., Ltd.), MPR-TA, MPR-TA5, MPR-TAL, MPR-TSN, MPR-TMF, MPR-TS, MPR-TM, and MPR-TAO (manufactured by Nisshin Chemical Industry Co., Ltd.), 1000W, DX80, DX81, DX82, DX83, and 100FD (manufactured by Electro Chemical Industry Co., Ltd.), MR-104, MR-105, MR-110, MR-100, MR-555, 400X-110A (manufactured by Nippon Zeon Co., Ltd.), Nippollan N2301, N2302, and N2304 (manufactured by Nippon Polyurethane Co., Ltd.), Pandex T-5105, T-R3080, T-5201, Burnock D-400, D-210-80, Crisvon 6109 and 7209 (manufactured by Dainippon Chemicals and Ink.), Vylon UR8200, UR8300, UR8700, RV530, and RV280 (manufactured by Toyobo Co., Ltd.), Daipheramine 4020, 5020, 5100, 5300, 9020, 9022, and 7020 (manufactured by Dainichi Seika K.K.), MX5004 (manufactured by Mitsubishi Kasei Corp.), Sunprene SP-150 (manufactured by Sanyo Chemical Industries Co. Ltd.), Salan F310 and F210 (manufactured by Asahi Chemical Industry Co., Ltd.), etc.

The amount of the binder for use in the nonmagnetic lower layer and the magnetic layer according to the present invention is from 5 to 50% by weight, preferably from 10 to 30% by weight, based on the amount of the nonmagnetic powder or the magnetic powder. When vinyl chloride resins are used, the amount thereof is from 5 to 30% by weight, when polyurethane resins are used, the amount thereof is from 2 to 20% by weight and also it is preferred polyisocyanate is used in an amount of from 2 to 20% by weight in combination. However, for instance, when head corrosion is caused by a slight amount of chlorine due to dechlorination, it is possible to use polyurethane alone or a combination of polyurethane and isocyanate alone. When polyurethane is used in the present invention, the polyurethane has a glass transition temperature of from −50 to 150° C., preferably from 0 to 100° C., breaking extension of from 100 to 2,000%, breaking stress of from 0.05 to 10 kg/mm$^2$, and a yielding point of from 0.05 to 10 kg/mm$^2$.

The magnetic recording medium according to the present invention may comprise two or more layers. Accordingly, the amount of the binder, the amounts of vinyl chloride resins, polyurethane resins, polyisocyanates or other resins contained in the binder, the molecular weight of each resin constituting the magnetic layer, the amount of polar groups, or the above-described physical properties of resins can of course be varied in the lower layer and the magnetic layer, according to necessity. These factors should be rather optimized in respective layers. Well-known techniques with respect to multilayer magnetic layers can be used in the present invention. For example, when the amount of the binder is varied in each layer, it is effective to increase the amount of the binder contained in the magnetic layer to reduce scratches on the surface of the magnetic layer. For improving the head touch against the head, it is effective to increase the amount of the binder in the lower layer to impart flexibility.

Examples of the polyisocyanates which can be used in the present invention include isocyanates, e.g., tolylenediisocyanate, 4,4, -diphenylmethanediisocyanate, hexamethylenediisocyanate, xylylenediisocyanate, naphthylene-1,5-diisocyanate, o-toluidinediisocyanate, isophoronediisocyanate, and triphenylmethanetriisocyanate; reaction products of these isocyanates with polyalcohols; and polyisocyanates formed by condensation reaction of isocyanates. These polyisocyanates are commercially available under the trade names of Coronate L, Coronate HL, Coronate 2030, Coronate 2031, Millionate MR, and Millionate MTL (manufactured by Nippon Polyurethane Co., Ltd.), Takenate D-102, Takenate D-110N, Takenate D-200, and Takenate D-202 (manufactured by Takeda Chemical Industries, Ltd.), and Desmodur L, Desmodur IL, Desmodur N, and Desmodur HL (manufactured by Sumitomo Bayer Co., Ltd.). These may be used alone or in combinations of two or more thereof, taking advantage of a difference in curing reactivity in each layer.

Carbon Black, Abrasive

Examples of carbon blacks for use in the magnetic layer according to the present invention include furnace blacks for rubbers, thermal blacks for rubbers, carbon blacks for coloring, acetylene blacks, etc. Carbon blacks for use in the magnetic layer of the present invention preferably have a specific surface area ($S_{BET}$) of from 5 to 500 m²/g, a DBP oil absorption of from 10 to 400 ml/100 g, an average particle size of from 5 to 300 mg, pH of from 2 to 10, a water content of from 0.1 to 10% by weight, and a tap density of from 0.1 to 1 g/ml. Specific examples of carbon blacks for use in the magnetic layer of the present invention include BLACKPEARLES 2000, 1300, 1000, 900, 905, 800, and 700, and VULCAN XC-72 (manufactured by Cabot Co., Ltd.), #80, #60, #55, #50, and #35 (manufactured by Asahi Carbon Co., Ltd.), #2400B, #2300, #900, #1000, #30, #40, and #10B (manufactured by Mitsubishi Kasei Corp.), CONDUCTEX SC, RAVEN 150, 50, 40, and 15, and RAVEN-MT-P (manufactured by Columbia Carbon Co., Ltd.), and Ketjen Black EC40 (manufactured by Akzo Co., Ltd.). Carbon blacks for use in the present invention may previously be surface-treated with a dispersant, may be grafted with a resin, or a part of the surface thereof may be graphitized before use. Carbon blacks may be previously dispersed in a binder before addition to the magnetic coating solution. These carbon blacks may be used alone or in combination. Carbon blacks are preferably used in an amount of from 0.1 to 30% by weight based on the amount of the ferromagnetic powder. Carbon blacks can serve various functions such as preventing static charges, reducing a friction coefficient, imparting a light-shielding property and improving a film strength. Such functions vary depending upon the kind of carbon blacks to be used. Accordingly, it is of course possible in the present invention to select and determine the kinds, the amounts and the combinations of the carbon blacks to be added to the upper magnetic layer and the lower layer, on the basis of the above mentioned various properties such as the particle size, the oil absorption amount, the electroconductivity and the pH value, or these should be rather optimized in respective layers. Regarding carbon blacks for use in the magnetic layer of the present invention, for example, the disclosure in *Handbook of Carbon Blacks* (edited by Carbon Black Association of Japan) can be referred to.

At least diamond fine particles are used as the abrasive in the present invention. The object of the present invention can be achieved as far as they are diamond particles, but as natural diamonds are expensive, in general, artificial diamonds are used. Producing methods of a diamond include a static synthesis method comprising producing a diamond using graphite, iron, Co and Ni under high temperature and high pressure, or subjecting graphite or fran resin carbon to reaction under high temperature and high pressure, a dynamic synthesis method and a vapor phase synthesis method, and any method can be used in the present invention.

It is industrially possible to secondarily use diamond chips and abrasives after discriminating impurities and washing. The method of the present invention prescribes the distribution of diamond particles. For the classification of diamond particles, using centrifugal force or a special mesh filter to classify diamond particles from a dispersion solution and the like.

In the present invention, diamond fine particles can be used in combination with other abrasives. As other abrasives usable in the present invention, well-known materials essentially having a Mohs' hardness of 6 or more may be used alone or in combination. Examples of such the abrasives include α-alumina having an alpha-conversion rate of 90% or more, β-alumina, silicon carbide, chromium oxide, cerium oxide, α-iron oxide, corundum, silicon nitride, silicon carbide, titanium carbide, titanium oxide, silicon dioxide, and boron nitride. Composites composed of these abrasives (abrasives obtained by surface-treating with other abrasives) may also be used. Compounds or elements other than the main component are often contained in these abrasives, but the intended effect can be attained so far as the content of the main component is 90% or more. Abrasives essentially have a particle size of from 0.01 to 2 μm, in particular, for improving electromagnetic characteristics, abrasives having narrow particle size distribution are preferred. Further, for improving durability, a plurality of abrasives each having a different particle size may be combined according to necessity, or a single abrasive having a broad particle size distribution may be employed so as to attain the same effect as such a combination. Preferably, abrasives for use in the present invention have a tap density of from 0.3 to 2 g/ml, a water content of from 0.1 to 5% by weight, a pH value of from 2 to 11 and a specific surface area ($S_{BET}$) of from 1 to 30 m /g. The shape of the abrasives to be used in the present invention may be any of acicular, spherical and die-like shapes. Preferably, the abrasive has a shape partly with edges, because a high abrasive property is given. Specific examples of abrasives for use in the present invention include AKP-12, AKP-15, AKP-20, AKP-30, AKP-50, HIT-20, HIT-30, HIT-55, HIT-60, HIT-70, HIT-80, and HIT-100 (manufactured by Sumitomo Chemical Co., Ltd.), ERC-DBM, HP-DBM, and HPS-DBM (manufactured by Reynolds International Inc.), WA10000 (manufactured by Fujimi Kenma K.K.), UB20 (manufactured by Uemura Kogyo K.K.), G-5, Kromex U2, and Kromex U1 (manufactured by Nippon Chemical Industrial Co., Ltd.), TF100 and TF140 (manufactured by Toda Kogyo Co., Ltd.), β-Random Ultrafine (manufactured by Ibiden Co., Ltd.), and B-3 (manufactured by Showa Mining Co., Ltd.). These abrasives may also be added to a lower layer, if necessary. By incorporating abrasives into a lower layer, it is possible to control the surface shape or prevent abrasives from protruding. Particle sizes and amounts of abrasives to be added to a magnetic layer and a lower layer should be selected independently at optimal values.

Additive

As additives which can be used in the magnetic layer and the lower layer of the present invention, those having a lubrication effect, an antistatic effect, a dispersing effect and a plasticizing effect may be used. Examples thereof include molybdenum disulfide, tungsten disulfide, graphite, boron nitride, graphite fluoride, silicone oil, polar group-containing silicons, fatty acid-modified silicons, fluorine-containing silicons, fluorine-containing alcohols, fluorine-containing esters, polyolefins, polyglycols, alkyl phosphates and alkali metal salts thereof, alkyl sulfates and alkali metal salts thereof, polyphenyl ethers, phenylphosphonic acids, α-naphthylphosphoric acids, phenylphosphoric acids, diphenylphosphoric acids, p-ethylbenzenephosphonic acids, phenylphosphinic acids, aminoquinones, various kinds of silane coupling agents, titanium coupling agents, fluorine-containing alkyl sulfates and alkali metal salts thereof, monobasic fatty acids having from 10 to 24 carbon atoms (which may contain an unsaturated bond or which may be branched) and metal salts thereof (e.g., with Li, Na, K or Cu), mono-, di-, tri-, tetra-, penta- or hexa-alcohols having from 12 to 22 carbon atoms (which may contain an unsaturated bond or may be branched), alkoxy alcohols having from 12 to 22 carbon atoms (which may contain an unsaturated bond or may be branched), mono-fatty acid esters, di-fatty acid esters or tri-fatty acid esters composed of a monobasic fatty acid having from 10 to 24 carbon atoms (which may contain an unsaturated bond or may be branched) and any one of mono-, di-, tri-, tetra-, penta- and hexa-alcohols having from 2 to 12 carbon atoms (which may contain an unsaturated bond or may be branched), fatty acid esters of monoalkyl ethers of alkylene oxide polymers, fatty acid amides having from 8 to 22 carbon atoms, and aliphatic amines having from 8 to 22 carbon atoms.

Specific examples of fatty acids for such the additives include capric acid, caprylic acid, lauric acid, myristic acid, palmitic acid, stearic acid, behenic acid, oleic acid, elaidic acid, linolic acid, linolenic acid, and isostearic acid. Examples of esters include butyl stearate, octyl stearate, amyl stearate, isooctyl stearate, butyl myristate, octyl myristate, butoxyethyl stearate, butoxy-diethyl stearate, 2-ethylhexyl stearate, 2-octyldodecyl palmitate, 2-hexyldodecyl palmitate, isohexadecyl stearate, oleyl oleate, dodecyl stearate, tridecyl stearate, oleyl erucic acid, neopentyl glycol didecanoate, and ethylene glycol dioleate, and examples of alcohols for the additives include oleyl alcohol, stearyl alcohol and lauryl alcohol. Additionally, examples of other additives which may be used include nonionic surfactants such as alkylene oxides, glycerols, glycidols or alkylphenol-ethylene oxide adducts; cationic surfactants such as cyclic amines, ester amides, quaternary ammonium salts, hydantoin derivatives, heterocyclic compounds, phosphoniums or sulfoniums; anionic surfactants containing an acidic group such as carboxylic acid, sulfonic acid, phosphoric acid, sulfate groups or phosphate groups; and amphoteric surfactants such as amino acids, aminosulfonic acids, sulfates or phosphates of amino alcohols or alkylbetains. The details of these surfactants are described in *Handbook of Surfactants* (published by Sangyo Tosho Co., Ltd.). These lubricants and antistatic agents may not always be 100% pure and may contain impurities such as isomers, non-reacted materials, byproducts, decomposed products and oxides, in addition to the main component. However, the content of such impurities is preferably 30% or less, more preferably 10% or less.

Lubricants and surfactants for use in the present invention respectively have different physical functions. The kinds, amounts and proportions of combination generating synergistic effect of these lubricants should be determined optimally in accordance with the purpose. The lower layer and the magnetic layer can separately contain different fatty acids each having a different melting point so as to prevent bleeding out of the fatty acids to the surface, or different esters each having a different boiling point, a different melting point or a different polarity so as to prevent bleeding out of the esters to the surface. Also, the amounts of surfactants are controlled so as to improve the coating stability, or the amount of the lubricant in the lower layer is made larger so as to improve the lubricating effect of the surface thereof. Examples are by no means limited thereto. In general, the total amount of the lubricants is from 0.1 to 50% by weight, preferably from 2 to 25% by weight, based on the weight of the ferromagnetic powder or the nonmagnetic powder.

All or a part of the additives to be used in the present invention may be added to the magnetic coating solution or the nonmagnetic coating solution in any step of the preparation. For example, additives may be blended with a magnetic powder before the kneading step, may be added during the step of kneading a magnetic powder, a binder and a solvent, may be added during the dispersing step, may be added after the dispersing step, or may be added immediately before coating. According to the purpose, there is a case of capable of attaining the object by coating all or a part of the additives simultaneously with or successively after the coating of the magnetic layer. According to the purpose, lubricants may be coated on the surface of the magnetic layer after the calendering treatment (a heating and pressurizing treatment by calender rolls) or after the completion of slitting.

Well-known organic solvents can be used in the present invention, for example, organic solvents disclosed in JP-6-68453 can be used.

Layer Construction

The thickness of the support in the magnetic recording medium of the present invention is, for example, from 2 to 100 μm, preferably from 2 to 80 μm. Particularly, the thickness of the support for a computer tape is from 3.0 to 6.5 μm, preferably from 3.0 to 6.0 μm, more preferably from 4.0 to 5.5 μm.

An undercoating layer (or a subbing layer) may be provided between the support and the lower layer or the magnetic layer for adhesion improvement. The thickness of this undercoating layer is from 0.01 to 0.5 μm, preferably from 0.02 to 0.5 μm. The lower layer and the magnetic layer of the magnetic recording medium according to the present invention may be provided on both surface sides of the support or may be provided on either one surface side. When the lower layer and the magnetic layer are provided on only one surface side of the support, a back coating layer may be provided on the surface side of the support opposite to the side having the lower layer and magnetic layer for the purpose of static charge prevention and curling correction. The thickness of this back coating layer is from 0.1 to 4 μm, preferably from 0.3 to 2.0 μm. Well-known undercoating layers and back coating layers can be used for this purpose.

The thickness of the magnetic layer of the magnetic recording medium of the present invention can be optimally selected according to the saturation magnetization amount of the head used, the head gap length, and the recording signal zone, and is preferably from 0.05 to 0.30 μm. The magnetic layer may comprise two or more layers each having different magnetic characteristics and well-known multilayer magnetic layer structures can be applied to the present invention.

The thickness of the lower layer of the magnetic recording medium according to the present invention is generally from 0.2 to 5.0 μm, preferably from 0.3 to 3.0 μm, and more preferably from 1.0 to 2.5 μm. The lower layer of the recording medium of the present invention exhibits the effect of the present invention so long as it is substantially a nonmagnetic layer even if, or intendedly, it contains a small amount of a magnetic powder as an impurity, which is as a matter of course regarded as essentially the same construction as in the present invention. The term "substantially a nonmagnetic layer" means that the residual magnetic flux density of the lower layer is 100 G or less and the coercive force of the lower layer is 100 Oe or less, preferably the residual magnetic flux density and the coercive force are zero.

Support

A support for use in the present invention is preferably a nonmagnetic support. As a nonmagnetic support for use in the present invention, well-known films such as polyesters (e.g., polyethylene terephthalate or polyethylene naphthalate), polyolefins, cellulose triacetate, polycarbonate, polyamide, polyimide, polyamideimide, polysulfone, polyaramide, aromatic polyamide, or polybenzoxazole can be used. Highly strong supports such as polyethylene naphthalate or polyamide are preferably used. If necessary, a lamination type support as disclosed in JP-A-3-224127 can be used to vary the surface roughnesses of the magnetic layer surface and the base surface. The support may be previously subjected to surface treatments, such as a corona discharge treatment, a plasma treatment, an adhesion assisting treatment, a heat treatment, and a dust removing treatment. Aluminum or glass substrate can also be used as a support in the present invention.

For attaining the object of the present invention, it is preferred to use the support having a central plane average surface roughness (SRa) of 8.0 nm or less, preferably 4.0 nm or less, more preferably 2.0 nm or less, measured by a surface roughness meter "TOPO-3D" (a product of WYKO Co., Ltd., U.S.A.) by MIRAU method. It is preferred that the support not only has a small central plane average surface roughness but also is free from coarse protrusions (having a height) of 0.5 µm or more. Surface roughness configuration is freely controlled by the size and the amount of fillers added to the support. Examples of such fillers include acryl-based organic fine powders, as well as oxides or carbonates of Ca, Si and Ti. The support for use in the present invention preferably has the maximum height (SRmax) of 1 µm or less, ten point average roughness (SRz) of 0.5 µm or less, central plane peak height (SRp) of 0.5 µm or less, central plane valley depth (SRv) of 0.5 µm or less, central plane area factor (SSr) of from 10% to 90%, and average wavelength (Sλa) of from 5 µm to 300 µm. For obtaining desired electromagnetic characteristics and durability, surface protrusion distribution of the support can be controlled arbitrarily by fillers, e.g., the number of protrusions having sizes of from 0.01 µm to 1 µm can be controlled each within the range of from 0 to 2,000 per 0.1 $mm^2$.

The F-5 value of the nonmagnetic support for use in the present invention is preferably from 5 to 50 $kg/mm^2$, a thermal shrinkage factor of the support at 100° C. for 30 minutes is preferably 3% or less, more preferably 1.5% or less, and a thermal shrinkage factor at 80° C. for 30 minutes is preferably 0.5% or less, and more preferably 0.1% or less. The support has a breaking strength of from 5 to 100 $kg/mm^2$, an elastic modulus of from 100 to 2,000 $kg/mm^2$, a temperature expansion coefficient of from $10^{-4}$ to $10^{-8}$/° C., preferably from $10^{-5}$ to $10^{-6}$/° C., and a humidity expansion coefficient of $10^{-4}$/RH% or less, preferably $10^{-5}$/RH% or less. These thermal characteristics, dimensional characteristics and mechanical strength characteristics are preferably almost equal in every direction of in-plane of the support with difference of not more than 10%.

Producing Method

Processes of preparing the magnetic coating solution for use in the magnetic recording medium of the present invention comprises at least a kneading step, a dispersing step and, optionally, blending steps to be carried out before and/or after the kneading and dispersing steps. Any of these respective steps may be composed of two or more separate stages. Materials such as a magnetic powder, a nonmagnetic powder, a binder, a carbon black, an abrasive, an antistatic agent, a lubricant, a solvent, and the like for use in the present invention may be added at any step at any time. Each material may be added at two or more steps dividedly. For example, polyurethane can be added dividedly at a kneading step, a dispersing step, or a blending step for adjusting viscosity after dispersion. For achieving the object of the present invention, the above steps can be performed partly with conventionally well-known techniques. Powerful kneading machines such as an open kneader, a continuous kneader, a pressure kneader or an extruder are preferably used in a kneading step. When a kneader is used, all or a part of a binder (preferably 30% by weight or more of the total binders) are(is) kneading-treated in the range of from 15 parts to 500 parts per 100 parts of the magnetic powder or nonmagnetic powder together with a magnetic powder or a nonmagnetic powder. Details of these kneading are disclosed in JP-A-1-106338 and JP-A-1-79274. When dispersing a magnetic layer solution and a lower layer solution, glass beads can be used but dispersing media having a high specific gravity is preferably used and zirconia beads, titania beads and steel beads are suitable for this purpose. Optimal particle size and packing density of these dispersing media should be selected. Well-known dispersing apparatuses can be used in the present invention.

The following methods are preferably used for coating the magnetic recording medium having a multilayer construction of the present invention. As the first method, the lower layer is coated by any of gravure coating, roll coating, blade coating, and extrusion coating apparatuses, which are ordinarily used in the coating of a magnetic coating solution, and the upper layer is coated while the lower layer is still wet by means of the support pressing type extrusion coating apparatus disclosed in JP-B-1-46186, JP-A-60-238179 and JP-A-2-265672. As the second method, the upper layer and the lower layer are coated almost simultaneously using the coating head equipped with two slits for feeding coating solution as disclosed in JP-A-63-88080, JP-A-2-17971 and JP-A-2-265672. And as the third method, the upper layer and the lower layer are coated almost simultaneously using the extrusion coating apparatus equipped with a backup roll as disclosed in JP-A-2-174965. For preventing the deterioration of the electromagnetic characteristics of the magnetic recording medium due to agglomeration of magnetic powders, it is preferred to impart shear to the coating solution in the coating head by the methods as described in JP-A-62-95174 and JP-A-1-236968. With respect to the viscosity of the coating solution, the range of the numeric values disclosed in JP-A-3-8471 is necessary to be satisfied. For realizing the constitution of the present invention, successive multilayer coating method in which the magnetic layer is coated on the lower layer after the lower layer has been coated and dried can of course be used without impairing the effect of the present invention. However, for reducing coating defects and improving quality, e.g., dropout, it is preferred to use the above simultaneous multilayer coating method.

In the case of a magnetic disc, isotropic orienting property can be sufficiently obtained in some cases without conducting orientation using orientating apparatus, but it is preferred to use well-known random orientation apparatuses, such as disposing cobalt magnets diagonally and alternately or applying an alternating current magnetic field using a solenoid. Isotropic orientation in a ferromagnetic metal fine powder is in general preferably in-plane two dimensional random orientation, but it may be three dimensional random orientation having vertical components. Hexagonal ferrites in general have an inclination for three dimensional random orientation of in-plane and in the vertical direction but it can be made in-plane two dimensional random orientation. Further, it is possible to impart isotropic magnetic characteristics in the circumferential direction by vertical orientation using well-known methods, e.g., using different pole and counter position magnets. In particular, vertical orientation is preferred when the disc is used for high density recording. Circumferential orientation can be conducted using spin coating.

In the case of a magnetic tape, orientation is conducted in the machine direction using a cobalt magnet and a solenoid. In orientation, it is preferred that the drying position of the coated film can be controlled by controlling the temperature and the amount of drying air and coating rate. Coating rate is preferably from 20 to 1,000 m/min. and the temperature of drying air is preferably 60° C. or more. Preliminary drying can be performed appropriately before entering the magnet zone.

Use of heat resisting plastic rolls such as epoxy, polyimide, polyamide and polyimideamide, or metal rolls is effective for calendering treatment. Metal rolls are usable for the treatment particularly when magnetic layers are coated on both surface sides. Treatment temperature is preferably 50° C. or more, more preferably 100° C. or more. Line pressure is preferably 200 kg/cm or more, more preferably 300 kg/cm or more.

Physical Properties

Saturation magnetic flux density of the magnetic layer of the magnetic recording medium according to the present invention is from 2,000 to 6,000 G when a ferro-magnetic metal fine powder is used. Coercive force distribution is preferably narrow, and SFD and SFDr are preferably 0.6 or less. When the recording medium is a disc, squareness ratio is from 0.45 to 0.55 in the case of random orientation, from 0.6 to 0.67 in the case of two dimensional random orientation, and when the recording medium is a tape, 0.8 or more, and in the case of vertical orientation, 0.5 or more.

Saturation magnetic flux density of the magnetic layer is from 1,000 to 3,000 G when a hexagonal ferrite is used. When the recording medium is a disc, squareness ratio is from 0.45 to 0.55 in the case of random orientation, from 0.5 to 0.64 in the case of two dimensional random orientation, and when the recording medium is a tape, 0.5 or more, and in the case of vertical orientation, 0.5 or more.

The friction coefficient of the magnetic recording medium according to the present invention against a head at temperature of −10° C. to 40° C. and humidity of 0% to 95% is 0.5 or less, preferably 0.3 or less, the surface inherent resistivity of the magnetic surface is preferably from $10^4$ to $10^{12}$ Ω/sq, the charge potential is preferably from −500 V to +500 V, the elastic modulus at 0.5% elongation of the magnetic layer is preferably from 100 to 2,000 kg/mm² in every direction of in-plane, the breaking strength is preferably from 10 to 70 kg/mm², the elastic modulus of the magnetic recording medium is preferably from 100 to 1,500 kg/mm² in every direction of in-plane, the residual elongation is preferably 0.5% or less, and the thermal shrinkage factor at every temperature of 100° C. or less is preferably 1% or less, more preferably 0.5% or less, and most preferably 0.1% or less. The glass transition temperature of the magnetic layer (the maximum of elastic modulus loss by dynamic visco-elasticity measurement at 110 Hz) is preferably from 50° C. to 120° C., and that of the lower layer is preferably from 0° C. to 100° C. The elastic modulus loss is preferably within the range of from $1\times10^8$ to $8\times10^9$ dyne/cm², and loss tangent is preferably 0.2 or less. If loss tangent is too large, adhesion failure is liable to occur. These thermal and mechanical characteristics are preferably almost equal in every direction of in-plane of the medium with difference of not more than 10%. The residual amount of the solvent in the magnetic layer is preferably 100 mg/m² or less, more preferably 10 mg/m² or less. The void ratio is preferably 30% by volume or less, more preferably 20% by volume or less, with both of the nonmagnetic lower layer and the magnetic layer. The void ratio is preferably smaller for obtaining high output but in some cases a specific value should be preferably secured depending on purposes. For example, in a disc-like medium which is repeatedly used, large void ratio contributes to good running durability in many cases.

The central plane average surface roughness (Ra) of the magnetic layer for use in the present invention is as described above. The magnetic layer has the maximum height (SRmax) of 0.5 μm or less, ten point average roughness (SRz) of 0.3 μm or less, central plane peak height (SRp) of 0.3 μm or less, central plane valley depth (SRv) of 0.3 μm or less, central plane area factor (SSr) of from 20% to 80%, and average wavelength (Sλa) of from 5 μm to 300 μm. For obtaining desired electromagnetic characteristics and friction coefficient, a number of surface protrusion of the magnetic layer of sizes (i.e., height) of from 0.01 μm to 1 μm can be controlled arbitrarily within the range of from 0 to 2,000 by controlling the surface property due to fillers in the support, the particle size and the amount of the magnetic powders added to the magnetic layer, or by varying the surface shape of rolls of calender treatment. The range of curling is preferably within ±3 mm.

In the magnetic recording medium according to the present invention, these physicas properties in the lower layer and the magnetic layer can be varied according to purposes. For example, the elastic modulus of the magnetic layer is made higher to improve running durability and at the same time the elastic modulus of the lower layer is made lower than that of the magnetic layer to improve the head touching of the magnetic recording medium.

EXAMPLE

The present invention will be illustrated in detail with reference to examples below, but these are not to be construed as limiting the invention. In examples "parts" means parts by weight.

Characteristics of the magnetic powders for use in examples are listed in Tables 1 and 2 below.

TABLE 1

Barium Ferrite Magnetic Powder

| Magnetic Powder | Average Tabular Diameter (nm) | Tabular Ratio | Hc (Oe) | $\sigma_s$ (emu/g) | Element Contained (mol per mol of Ba) |
|---|---|---|---|---|---|
| BaF (1) | 25 | 3 | 2,380 | 56 | Zn 0.8, Co 0.2, Nb 0.45, Al 1.5 |

TABLE 1-continued

Barium Ferrite Magnetic Powder

| Magnetic Powder | Average Tabular Diameter (nm) | Tabular Ratio | Hc (Oe) | $\sigma_s$ (emu/g) | Element Contained (mol per mol of Ba) |
|---|---|---|---|---|---|
| BaF (2) | 20 | 3 | 2,030 | 49 | Zn 0.8, Co 0.1, Nb 0.5, Al 2 |
| BaF (3) | 35 | 3 | 2,310 | 58 | Zn 0.6, Co 0.1, Nb 0.4, Al 2 |
| BaF (4) | 25 | 3 | 1,830 | 55 | Zn 0.6, Co 0.3, Nb 0.6, Al 2 |
| BaF (5) | 25 | 3 | 2,960 | 54 | Zn 0.4, Co 0.1, Nb 0.3, Al 2 |
| BaF (6) | 25 | 3 | 1,720 | 53 | Zn 0.7, Co 0.4, Nb 0.6, Al 2 |

TABLE 2

Ferromagnetic Metal Powder

| Magnetic Powder | Average Long Axis Length (nm) | Acicular Ratio | Hc (Oe) | $\sigma_s$ (emu/g) | Element Contained (atomic % based on Fe) |
|---|---|---|---|---|---|
| MP (1) | 80 | 5 | 2,340 | 160 | Co 30, Al 7, Y 6 |
| MP (2) | 50 | 6 | 2,320 | 140 | Co 30, Al 10, Y 5 |
| MP (3) | 80 | 5 | 1,890 | 140 | Co 20, Al 7, Y 5 |
| MP (4) | 80 | 5 | 1,700 | 140 | Co 20, Al 6, Y 6 |

Magnetic discs and magnetic tapes were prepared as follows using the magnetic powders shown in Tables 1 and 2.

Preparation of Coating Solution

Magnetic Coating Solution 1 (hexagonal ferrite, disc)

| | |
|---|---|
| Barium ferrite magnetic powder (see Table 3) | 100 parts |
| Vinyl chloride copolymer | 5 parts |
| MR555 (manufactured by Nippon Zeon Co., Ltd.) | |
| Polyurethane resin | 3 parts |
| UR 8200 (manufactured by Toyobo Co., Ltd.) | |
| Carbon black | 1 part |
| #50 (manufactured by Asahi Carbon Co., Ltd.) | |
| Phenylphosphonic acid | 2 parts |
| Butyl stearate | 10 parts |
| Butoxyethyl stearate | 5 parts |
| Isohexadecyl stearate | 3 parts |
| Stearic acid | 2 parts |
| Methyl ethyl ketone | 125 parts |
| Cyclohexanone | 125 parts |

Magnetic Coating Solution 2 (hexagonal ferrite powder, tape)

| | |
|---|---|
| Barium ferrite magnetic powder (see Table 5) | 100 parts |
| Vinyl chloride copolymer | 6 parts |
| MR555 (manufactured by Nippon Zeon Co., Ltd.) | |
| Polyurethane resin | 3 parts |
| UR 8200 (manufactured by Toyobo Co., Ltd.) | |
| Carbon black (particle size: 0.015 μm) | 5 parts |
| #55 (manufactured by Asahi Carbon Co., Ltd.) | |
| Phenylphosphonic acid | 2 parts |
| Butyl stearate | 1 part |
| Stearic acid | 2 parts |
| Methyl ethyl ketone | 125 parts |
| Cyclohexanone | 125 parts |

Magnetic Coating Solution 3 (ferromagnetic metal powder, disc)

| | |
|---|---|
| Ferromagnetic metal fine powder (see Table 4) | 100 parts |
| Vinyl chloride copolymer | 12 parts |
| MR110 (manufactured by Nippon Zeon Co., Ltd.) | |
| Polyurethane resin | 3 parts |
| UR 8200 (manufactured by Toyobo Co., Ltd.) | |
| Carbon black | 5 parts |
| #50 (manufactured by Asahi Carbon Co., Ltd.) | |
| Phenylphosphonic acid | 3 parts |
| Butyl stearate | 10 parts |
| Butoxyethyl stearate | 5 parts |
| Isohexadecyl stearate | 3 parts |
| Stearic acid | 2 parts |
| Methyl ethyl ketone | 180 parts |
| Cyclohexanone | 180 parts |

Magnetic Coating Solution 4 (ferromagnetic metal powder, tape)

| | |
|---|---|
| Ferromagnetic metal fine powder (see Table 5) | 100 parts |
| Vinyl chloride copolymer | 12 parts |
| MR110 (manufactured by Nippon Zeon Co., Ltd.) | |
| Polyurethane resin | 3 parts |
| UR 8200 (manufactured by Toyobo Co., Ltd.) | |
| Carbon black | 1 part |
| #55 (manufactured by Asahi Carbon Co., Ltd.) | |
| Butyl stearate | 1 part |
| Stearic acid | 5 parts |
| Methyl ethyl ketone | 100 parts |
| Cyclohexanone | 20 parts |
| Toluene | 60 parts |

Nonmagnetic Coating Solution 5 (for a lower layer, disc)

| | |
|---|---|
| Nonmagnetic powder, TiO$_2$, crystal system rutile | 80 parts |
| Average primary particle size: 0.035 μm | |
| Specific surface area (S$_{BET}$): 40 m$^2$/g | |
| pH: 7 | |
| TiO$_2$ content: 90% or more | |
| DBP oil absorption: 27 to 38 ml/100 g | |
| Surface-covering compound: Al$_2$O$_3$, 8 wt % | |
| Carbon black | 20 parts |
| CONDUCTEX SC-U (manufactured by Columbia Carbon Co., Ltd.) | |
| Vinyl chloride copolymer | 12 parts |
| MR110 (manufactured by Nippon Zeon Co., Ltd.) | |
| Polyurethane resin | 5 parts |
| UR 8200 (manufactured by Toyobo Co., Ltd.) | |
| Phenylphosphonic acid | 4 parts |
| Butyl stearate | 10 parts |
| Butoxyethyl stearate | 5 parts |
| Isohexadecyl stearate | 2 parts |
| Stearic acid | 3 parts |
| Methyl ethyl ketone/cyclohexanone (8/2 mixed solvent) | 250 parts |

Nonmagnetic Coating Solution 6 (for a lower layer, tape)

| | |
|---|---|
| Nonmagnetic powder, TiO$_2$, crystal system rutile | 80 parts |
| Average primary particle size: 0.035 μm | |
| Specific surface area (S$_{BET}$): 40 m$^2$/g | |
| pH: 7 | |
| TiO$_2$ content: 90% or more | |
| DBP oil absorption: 27 to 38 ml/100 g | |
| Surface-covering compound: Al$_2$O$_3$, 8 wt % | |
| Carbon black | 20 parts |
| CONDUCTEX SC-U (manufactured by Columbia Carbon Co., Ltd.) | |
| Vinyl chloride copolymer | 12 parts |
| MR110 (manufactured by Nippon Zeon Co., Ltd.) | |
| Polyurethane resin | 5 parts |
| UR 8200 (manufactured by Toyobo Co., Ltd.) | |
| Phenylphosphonic acid | 4 parts |
| Butyl stearate | 1 part |
| Stearic acid | 3 parts |
| Methyl ethyl ketone/cyclohexanone (8/2 mixed solvent) | 250 parts |

Preparation Method 1 (disc)

Each of the above compositions of the coating solutions for the magnetic layer and the nonmagnetic layer was blended in a kneader, then the diamond fine particle shown in Table 3 or 4 was added (or not added) to each solution and dispersed with a sand mill. Subsequently, the paste ("SLH55", manufactured by Sumitomo Chemical Co., Ltd) in which HIT55 (which was α-alumina) was dispersed in MR110 was added (or not added) in an amount shown in Table 3 or 4, further, polyisocyanate was added to each resulting dispersion solution, in an amount of 10 parts to the (nonmagnetic) lower layer coating solution, and 10 parts to the magnetic layer coating solution. Further, 40 parts of cyclohexanone was added to each solution. Each solution was filtered through a filter having an average pore diameter of 1 μm to obtain coating solutions for forming the nonmagnetic lower layer and the magnetic layer.

These coating solutions were simultaneously multilayer-coated on a polyethylene terephthalate support having a thickness of 62 μm and a central plane average surface roughness of 3 nm of the surface side on which a magnetic layer was to be coated. The nonmagnetic lower layer coating solution was coated in a dry thickness of 1.5 μm, immediately thereafter the magnetic layer coating solution was coated on the nonmagnetic layer so as to give the magnetic layer having the thickness of 0.2 μm. When the ferromagnetic metal powder was used, the layer containing the ferromagnetic metal powder was subjected to random orientation while the magnetic layer and the nonmagnetic layer were still wet by passing through an alternating current magnetic field generator having two magnetic field intensities of frequency of 50 Hz, magnetic field intensity of 250 Gauss and frequency of 50 Hz, magnetic field intensity of 120 Gauss. After drying, the coated layer was subjected to calendering treatment with calenders of 7 stages at 90° C. at line pressure of 300 kg/cm. The obtained web was punched to a disc of 3.5 inches, the disc was subjected to a surface treatment by abrasives, thereby a magnetic recording disc was obtained. When hexagonal ferrite magnetic powder was used, a magnetic recording disc was produced in the same producing steps as above except that random orientation was omitted.

Preparation Method 1-2 (disc)

Magnetic recording discs No. 16 and No. 29 in Tables 3 and 4 were prepared in the same manner as in Preparation Method 1, except that the polyethylene terephthalate support having a central plane average surface roughness of 7 nm was used.

Preparation Method 2 (computer tape)

Each of the above compositions of the coating solutions for the magnetic layer and the nonmagnetic lower layer was blended in a kneader, then the diamond fine particle shown in Table 5 was added (or not added) to each solution, further, the past ("SLH55", manufactured by Sumitomo Chemical Co., Ltd) in which HIT55 (which was α-alumina) was dispersed in MR110 was added (or not added) in an amount shown in Table 5 and dispersed with a sand mill. Subsequently, polyisocyanate was added to each resulting dispersion solution, in an amount of 2.5 parts to the lower layer coating solution, and 3 parts to the magnetic layer coating solution. Further, 40 parts of cyclohexanone was added to each solution and each solution was filtered through a filter having an average pore diameter of 1 μm to obtain coating solutions for forming the (nonmagnetic) lower layer and the magnetic layer.

These coating solutions obtained were simultaneously multilayer-coated on an aramide support (trade name: Mictron) having a thickness of 4.4 μm and a central plane average surface roughness of 2 nm of the surface side on which a magnetic layer was to be coated. The lower layer coating solution was coated in a dry thickness of 1.7 μm, immediately thereafter the magnetic layer coating solution was coated on the lower layer so as to give the magnetic layer having a thickness of 0.15 μm. The coated layers were oriented with a cobalt magnet having a magnetic force of 6,000 G and a solenoid having a magnetic force of 6,000 G while both layers were still wet. After drying, the coated layers were subjected to calendering treatment with calenders of 7 stages comprising metal rolls at 85° C. at a rate of 200 m/min. Subsequently, a backing layer (100 parts of a carbon black having an average particle size of 17 mμ, 80 parts of calcium carbonate having an average particle size of 40 mμ, and 5 parts of α-alumina having an average particle size of 200 mμ were dispersed in a nitrocellulose resin, a polyurethane resin and a polyisocyanate) having a thickness of 0.5 μm was coated. The obtained web was slit to a width of 3.8 mm. The magnetic layer surface of the thus-produced tape was cleaned with a tape cleaning apparatus of a nonwoven fabric and a razor blade pressed against the surface of the tape, which was attached to a machine having delivery and winding-up movement of a slit product. Thus, tape samples were obtained.

The above-obtained magnetic powders, magnetic discs and computer tapes were respectively evaluated as follows.
Measuring Method (1) Magnetic characteristics (Hc, $\sigma_2$):

Magnetic characteristics were measured using a vibrating sample magnetometer (a product of Toei Kogyo Co., Ltd.) by Hm 10 KOe.

(2) Diamond Fine Particle (particle size distribution):

An appropriate amount of a diamond particle was photographed by an electron microscope. From the electron microphotographs, 500 particles were randomly sampled, and an average particle size φ, the proportion of the number of particles having the particle size of 200% or more of the average particle size φ accounting for in the entire number of diamond particles (ΔN200) (%), and the proportion of the number of particles having the particle size of 50% or less of the average particle size φ accounting for in the entire number of diamond particles (ΔN50) (%) were obtained.

(3) Central Plane Average Surface Roughness (Ra):

Surface roughness (Ra) of the area of about 250 μm×250 μm was measured using "TOPO3D" (a product of WYKO, U.S.A.) by 3D-MIRAU method. The wavelength of measurement was about 650 nm and spherical compensation and cylindrical compensation were applied. Measurement was performed using a light interference type non-contact surface roughness meter.

(4) Electromagnetic characteristics of a disc:

Output/reproduction was measured using a disc tester manufactured by Kokusai Denshi Kogyo Co., Ltd. (the late Tokyo Engineering Co., Ltd.) and an SK606B type disc evaluation apparatus by a metal-in-gap head having a gap length of 0.3 μm. Recording was conducted at the position of radius of 24.6 mm by a recording wavelength of 90 KFCI, then reproduction output of a head amplifier was determined by an oscilloscope 7633 type manufactured by Techtronics Co., Ltd.

S/N ratio: After DC erasure of the disc used for determining reproduction output, reproduction output (noise level) was measured by a TR4171 type spectrum analyzer (manufactured by Advantes Co., Ltd.).

−20log (noise/reproduction output) was taken as S/N ratio and represented as a relative value taking the S/N value of Sample Nos. 1 and 19 as 0 dB.

(5) Electromagnetic characteristics of a tape:

C/N ratio (tape): digital signals were recorded and reproduced with a recording head (MIG, gap length: 0.15 μm, 1.8 T) being attached to a drum tester. Relative speed of head-medium was 3 m/sec, recording wavelength was 0.35 µm, and modulated noise was determined.

(6) Durability:

(1) Durability of a Magnetic Disc:

A floppy disc drive ("ZIP100", a product of IOMEGA CORP., U.S.A., rotation number: 2,968 rpm) was used. The head was fixed at the position of radius of 38 mm. The disc was run under the following thermo-cycle condition, which being taken as one cycle. The point when scratches were visually observed on the surface of the sample was taken as NG. The time of durability of Sample No. 1 was taken as 100%.

Thermo-Cycle Flow

25° C., 50% RH, 1 hr→(temperature up, 2 hr)→60° C., 20% RH, 7 hr→(temperature down, 2 hr)→25° C., 50% RH, 1 hr→(temperature down, 2 hr) 5° C., 10% RH, 7 hr→(temperature up, 2 hr)→(this cycle was repeated).

(2) Durability of a Computer Tape:

Predetermined signals were recorded using a DDS drive. The disc was run at 50° C., 10% RH while monitoring reproduced signals, and the point when the initial reproduction output reached 70% was taken as NG. The durability of Sample No. 32 was taken as 100%.

The results of evaluation of magnetic discs are shown in Tables 3 and 4 and the results of evaluation of magnetic tapes are shown in Table 5, respectively.

TABLE 3

Evaluation of disc in which barium ferrite powder is used

| Sample No. | Remarks | Magnetic Powder | Average Tabular Diameter (nm) | Magnetic Layer Hc (Oe) | Magnetic Layer Ra (nm) | Diamond Fine Particle φ (µm) | Diamond Fine Particle $\Delta N_{200}$ (%) | Diamond Fine Particle $\Delta N_{50}$ (%) | A | B | S/N Ratio (dB) | Durability (%) |
|---|---|---|---|---|---|---|---|---|---|---|---|---|
| 1 | Comp. Ex. | BaF (1) | 25 | 2,400 | 4.1 | — | — | — | 0 | 20 | 0 | 100 |
| 2 | Comp. Ex. | BaF (1) | 25 | 2,410 | 3.9 | — | — | — | 0 | 10 | 2.5 | 30 |
| 3 | Comp. Ex. | BaF (1) | 25 | 2,410 | 3.2 | 2.2 | 0 | 7 | 1.5 | 0 | −0.3 | 100 |
| 4 | Comp. Ex. | BaF (1) | 25 | 2,400 | 3.0 | 0.06 | 2 | 10 | 1.5 | 0 | 4.5 | 5 |
| 5 | Ex. | BaF (1) | 25 | 2,400 | 3.6 | 0.4 | 3 | 7 | 1.5 | 0 | 3.7 | 100 |
| 6 | Ex. | BaF (1) | 25 | 2,400 | 2.8 | 0.2 | 2 | 6 | 1.5 | 0 | 4.2 | 100 |
| 7 | Ex. | BaF (1) | 25 | 2,410 | 3.0 | 0.2 | 2 | 6 | 0.5 | 5 | 3.9 | 100 |
| 8 | Ex. | BaF (1) | 25 | 2,410 | 3.1 | 0.3 | 0 | 5 | 1.0 | 0 | 4.0 | 100 |
| 9 | Ex. | BaF (1) | 25 | 2,400 | 2.7 | 0.3 | 0 | 5 | 0.3 | 10 | 4.0 | 100 |
| 10 | Ex. | BaF (2) | 20 | 2,050 | 2.1 | 0.3 | 0 | 5 | 0.3 | 10 | 5.0 | 100 |
| 11 | Ex. | BaF (3) | 35 | 2,360 | 4.2 | 0.4 | 3 | 7 | 0.3 | 10 | 3.3 | 100 |
| 12 | Ex. | BaF (1) | 25 | 2,400 | 3.2 | 0.8 | 2 | 10 | 0.3 | 10 | 2.8 | 100 |
| 13 | Ex. | BaF (1) | 25 | 2,410 | 3.0 | 0.4 | 7 | 3 | 1.5 | 0 | 2.0 | 100 |
| 14 | Ex. | BaF (1) | 25 | 2,400 | 2.4 | 0.4 | 0 | 23 | 1.5 | 0 | 3.7 | 90 |
| 15 | Ex. | BaF (4) | 25 | 1,870 | 3.6 | 0.4 | 3 | 7 | 0.3 | 10 | 2.2 | 100 |
| 16 | Comp. Ex. | BaF (1) | 25 | 2,400 | 5.3 | 0.4 | 3 | 7 | 0.3 | 10 | 0.3 | 100 |
| 17 | Ex. | BaF (5) | 25 | 3,050 | 3.0 | 0.3 | 0 | 5 | 0.3 | 10 | 4.3 | 100 |
| 18 | Comp. Ex. | BaF (6) | 25 | 1,750 | 2.9 | 0.4 | 3 | 7 | 0.3 | 10 | 0.5 | 100 |

A: The addition amount of diamond fine particle in % by weight based on magnetic powders
B: The addition amount of alumina in % by weight based on magnetic powders

TABLE 4

Evaluation of disc in which ferromagnetic metal powder is used

| Sample No. | Remarks | Magnetic Powder | Average Long Axis Length (nm) | Magnetic Layer Hc (Oe) | Magnetic Layer Ra (nm) | Diamond Fine Particle φ (µm) | Diamond Fine Particle $\Delta N_{200}$ (%) | Diamond Fine Particle $\Delta N_{50}$ (%) | A | B | S/N Ratio (dB) | Durability (%) |
|---|---|---|---|---|---|---|---|---|---|---|---|---|
| 19 | Comp. Ex. | MP (1) | 80 | 2,300 | 4.1 | — | — | — | 0 | 20 | 0.0 | 100 |
| 20 | Comp. Ex. | MP (1) | 80 | 2,300 | 3.5 | — | — | — | 0 | 10 | 2.1 | 20 |
| 21 | Ex. | MP (1) | 80 | 2,310 | 3.1 | 0.2 | 2 | 6 | 1.5 | 0 | 3.5 | 100 |
| 22 | Ex. | MP (1) | 80 | 2,310 | 3.3 | 0.3 | 0 | 5 | 1.5 | 0 | 3.5 | 100 |
| 23 | Ex. | MP (1) | 80 | 2,310 | 3.0 | 0.3 | 0 | 5 | 0.3 | 7.5 | 3.6 | 100 |
| 24 | Ex. | MP (2) | 50 | 2,300 | 3.0 | 0.3 | 0 | 5 | 0.3 | 7.5 | 4.0 | 100 |
| 25 | Ex. | MP (1) | 80 | 2,360 | 1.9 | 0.8 | 2 | 10 | 1.0 | 0 | 3.0 | 100 |
| 26 | Ex. | MP (1) | 80 | 2,350 | 2.7 | 0.4 | 3 | 7 | 0.2 | 10 | 3.5 | 100 |

TABLE 4-continued

Evaluation of disc in which ferromagnetic metal powder is used

| Sample No. | Remarks | Magnetic Powder | Average Long Axis Length (nm) | Magnetic Layer Hc (Oe) | Magnetic Layer Ra (nm) | Diamond Fine Particle φ (μm) | Diamond Fine Particle ΔN$_{200}$ (%) | Diamond Fine Particle ΔN$_{50}$ (%) | A | B | S/N Ratio (dB) | Durability (%) |
|---|---|---|---|---|---|---|---|---|---|---|---|---|
| 27 | Ex. | MP (1) | 80 | 2,360 | 3.0 | 0.4 | 7 | 3 | 0.2 | 10 | 1.8 | 100 |
| 28 | Ex. | MP (1) | 80 | 2,350 | 3.0 | 0.4 | 0 | 23 | 0.2 | 10 | 3.3 | 95 |
| 29 | Comp. Ex. | MP (1) | 80 | 2,340 | 5.5 | 0.4 | 3 | 7 | 0.2 | 10 | 0.2 | 100 |
| 30 | Ex. | MP (3) | 80 | 1,850 | 3.0 | 0.4 | 3 | 7 | 0.2 | 10 | 2.0 | 100 |
| 31 | Comp. Ex. | MP (4) | 80 | 1,720 | 3.1 | 0.4 | 3 | 7 | 0.2 | 10 | 0.2 | 100 |

A: The addition amount of diamond fine particle in % by weight based on magnetic powders
B: The addition amount of alumina in % by weight based on magnetic powders

TABLE 5

Evaluation of magnetic recording tape

| Sample No. | Remarks | Magnetic Powder | Average Long Axis Length (nm) | Magnetic Layer Hc (Oe) | Magnetic Layer Ra (nm) | Diamond Fine Particle φ (μm) | Diamond Fine Particle ΔN$_{200}$ (%) | Diamond Fine Particle ΔN$_{50}$ (%) | A | B | S/N Ratio (dB) | Durability (%) |
|---|---|---|---|---|---|---|---|---|---|---|---|---|
| 32 | Comp. Ex. | MP (1) | 80 | 2,340 | 4.3 | — | — | — | 0 | 12 | 0.0 | 100 |
| 33 | Comp. Ex. | MP (1) | 80 | 2,340 | 3.3 | — | — | — | 0 | 6 | 1.5 | 20 |
| 34 | Ex. | MP (1) | 80 | 2,350 | 2.9 | 0.2 | 2 | 6 | 1.0 | 0 | 1.8 | 100 |
| 35 | Ex. | MP (1) | 80 | 2,350 | 3.0 | 0.3 | 0 | 5 | 0.2 | 6 | 2.0 | 100 |
| 36 | Ex. | MP (2) | 50 | 2,330 | 3.2 | 0.3 | 0 | 5 | 0.2 | 6 | 1.5 | 100 |
| 37 | Ex. | MP (2) | 50 | 2,390 | 2.8 | 0.4 | 3 | 7 | 0.2 | 10 | 1.3 | 100 |
| 38 | Comp. Ex. | BaF (1) | 25 | 2,430 | 3.9 | — | — | — | 0.0 | 12 | 0.0 | 100 |
| 39 | Comp. | BaF (1) | 25 | 2,450 | 4.0 | — | — | — | 0.0 | 6 | 2.0 | 30 |
| 40 | Ex. | BaF (1) | 25 | 2,450 | 2.6 | 0.3 | 0 | 5 | 0.3 | 6 | 2.2 | 100 |
| 41 | Ex. | BaF (2) | 20 | 2,100 | 1.9 | 0.3 | 0 | 5 | 0.3 | 6 | 2.3 | 100 |
| 42 | Ex. | BaF (2) | 20 | 2,350 | 2.4 | 0.2 | 2 | 6 | 1.0 | 0 | 2.4 | 100 |

A: The addition amount of diamond fine particle in % by weight based on magnetic powders
B: The addition amount of alumina in % by weight based on magnetic powders

EFFECT OF THE INVENTION

A magnetic recording medium having excellent durability and improved noise level in electromagnetic characteristics can be obtained according to the present invention which comprises a support having thereon in this order from the support side a substantially nonmagnetic lower layer and a magnetic layer comprising a ferromagnetic powder dispersed in a binder, wherein the magnetic layer preferably has a layer thickness of 0.3 μm or less, a coercive force of 1,800 Oe or more, central plane average surface roughness (Ra) of 5.0 nm or less, and the magnetic layer contains a diamond fine particle having an average particle size of from 0.10 to 1.0 μm in an amount of from 0.01 to 5% by weight based on the ferromagnetic powder.

While the invention has been described in detail and with reference to specific examples thereof, it will be apparent to one skilled in the art that various changes and modifications can be made therein without departing from the spirit and scope thereof.

What is claimed is:

1. A magnetic recording medium which comprises a support having thereon in this order from the support side a substantially nonmagnetic lower layer and a magnetic layer comprising a ferromagnetic powder dispersed in a binder, wherein said magnetic layer has a coercive force of 1,800 Oe or more, central plane average surface roughness (Ra) of 5.0 nm or less, and the magnetic layer contains diamond fine particles having an average particle size of from 0.10 to 1.0 μm in an amount of from 0.01 to 5% by weight based on the ferromagnetic powder, and wherein the number of diamond fine particles having the particle size of 200% or more of the average particle size accounts for 5% or less of the entire number of diamond fine particles, and the number of diamond fine particles having the particle size of 50% or less of the average particle size accounts for 20% or less of the entire number of diamond fine particles.

2. The magnetic recording medium as claimed in claim 1, wherein the thickness of said magnetic layer is 0.3 μm or less.

3. The magnetic recording medium as claimed in claim 1, wherein said ferromagnetic powder is a hexagonal ferrite powder having an average particle size of 35 nm or less.

4. The magnetic recording medium as claimed in claim 3, wherein said hexagonal ferrite powder is selected from the group consisting of substitution products of barium ferrite, strontium ferrite, lead ferrite and calcium ferrite, and Co substitution products.

5. The magnetic recording medium as claimed in claim 1, wherein said ferromagnetic powder is a ferromagnetic metal powder having an average long axis length of 150 nm or less.

6. The magnetic recording medium as claimed in claim 5, wherein said ferromagnetic metal powder is a ferromagnetic alloy powder containing α-Fe as a main component.

7. The magnetic recording medium as claimed in claim 1, wherein said diamond fine particle has a maximum value of the particle size of about 3.00 μm.

8. The magnetic recording medium as claimed in claim 1, wherein said magnetic layer contains an alumina abrasive in an amount of from 1 to 30% by weight in addition to the diamond fine particle.

9. The magnetic recording medium as claimed in claim 1, wherein said magnetic layer has an upper limit of the coercive force of about 3,500 Oe.

10. The magnetic recording medium as claimed in claim 1, wherein said magnetic layer and substantially nonmagnetic lower layer are coated on the support by a simultaneous or successive wet-on-wet coating method.

11. The magnetic recording medium as claimed in claim 1, wherein said substantially nonmagnetic lower layer has a thickness of from 0.2 to 5.0 μm.

12. The magnetic recording medium as claimed in claim 1, wherein said magnetic layer has a central plane average surface roughness (Ra) of 5.0 nm or less measured by 3D-MIRAU method.

\* \* \* \* \*